(12) United States Patent
Gucwa

(10) Patent No.: US 11,414,010 B2
(45) Date of Patent: Aug. 16, 2022

(54) STOP SIGN AND CROSSING ARM ASSEMBLIES FOR SCHOOL BUSES, STOP SIGNS FOR STOP SIGN ASSEMBLIES, AND ATTACHMENT SYSTEM FOR CONNECTING STOP SIGNS TO STOP SIGNS ASSEMBLIES

(71) Applicant: St. Clair Technologies, Inc., Chandler, AZ (US)

(72) Inventor: Mark David Gucwa, Ortonville, MI (US)

(73) Assignee: St. Clair Technologies, Inc., Chandler, AZ (US)

( * ) Notice: Subject to any disclaimer, the term of this patent is extended or adjusted under 35 U.S.C. 154(b) by 0 days.

(21) Appl. No.: 17/022,852

(22) Filed: Sep. 16, 2020

(65) Prior Publication Data
US 2021/0086688 A1 Mar. 25, 2021

Related U.S. Application Data

(60) Provisional application No. 62/902,629, filed on Sep. 19, 2019.

(51) Int. Cl.
*B60Q 1/26* (2006.01)
*B60Q 1/50* (2006.01)

(52) U.S. Cl.
CPC ......... *B60Q 1/2692* (2013.01); *B60Q 1/2615* (2013.01); *B60Q 1/2696* (2013.01); *B60Q 1/503* (2013.01)

(58) Field of Classification Search
CPC .. B60Q 1/2692; B60Q 1/2615; B60Q 1/2696; B60Q 1/503
See application file for complete search history.

(56) References Cited

U.S. PATENT DOCUMENTS

| 8,820,767 | B1* | 9/2014 | Osborne | B60G 11/225 |
|---|---|---|---|---|
| | | | | 280/43.13 |
| 10,875,644 | B2* | 12/2020 | Bosworth | B64F 1/16 |
| 2010/0315222 | A1* | 12/2010 | Vidri | B60Q 1/50 |
| | | | | 340/487 |
| 2013/0112835 | A1* | 5/2013 | Buley | B60Q 1/2692 |
| | | | | 248/224.8 |
| 2019/0272779 | A1 | 9/2019 | Gamble et al. | |

(Continued)

*Primary Examiner* — Mohamed Barakat
(74) *Attorney, Agent, or Firm* — Brooks Kushman P.C.

(57) ABSTRACT

An assembly includes a common parts sub-assembly, an actuator, a physical appendage, and a mounting bracket. The common parts sub-assembly includes a rotor bracket and a housing. The actuator is connected to the rotor bracket to cause the rotor bracket to rotate during actuator actuation. The actuator and the rotor bracket connected thereto are housed within the housing. The mounting bracket connects the physical appendage to the rotor bracket whereby the physical appendage moves between stowed and deployed positions during actuator actuation. The actuator is either an electric motor actuator or a pneumatic actuator that are substitutable with one another to assemble the assembly without modification to the common parts sub-assembly or the physical appendage. The physical appendage may be either a stop sign or a crossing guard arm that are substitutable with one another to assemble the assembly without modification to the common parts sub-assembly or the actuator.

10 Claims, 28 Drawing Sheets

(56) References Cited

U.S. PATENT DOCUMENTS

2019/0366916 A1* 12/2019 Singh .................... B60K 35/00
2020/0056851 A1*  2/2020 Watkins ................. F28G 15/04
2021/0221283 A1   7/2021 Yudelevich et al.

* cited by examiner

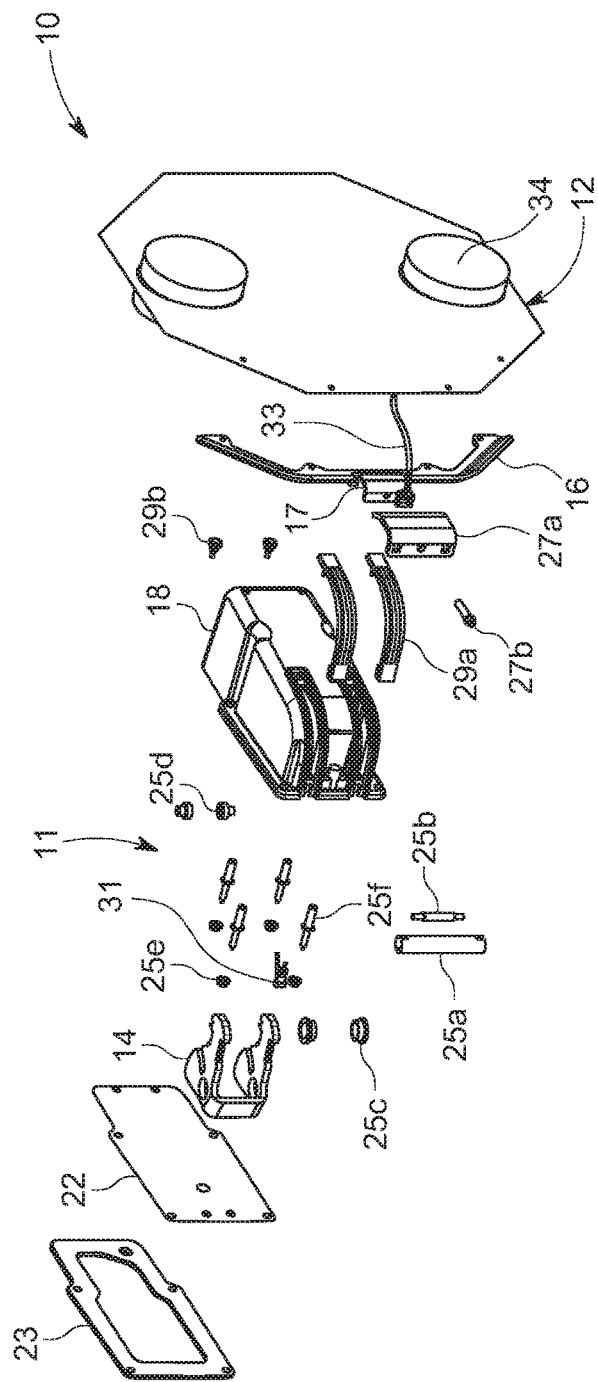
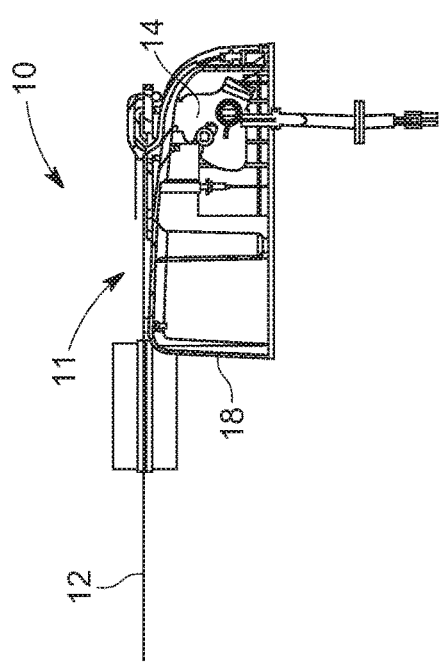
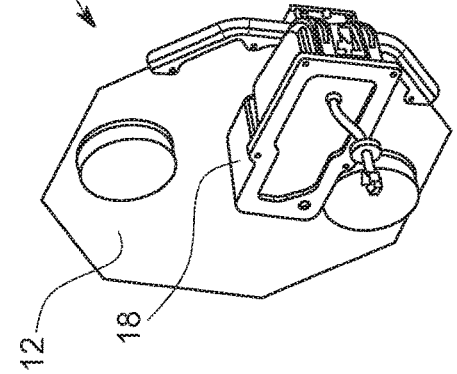
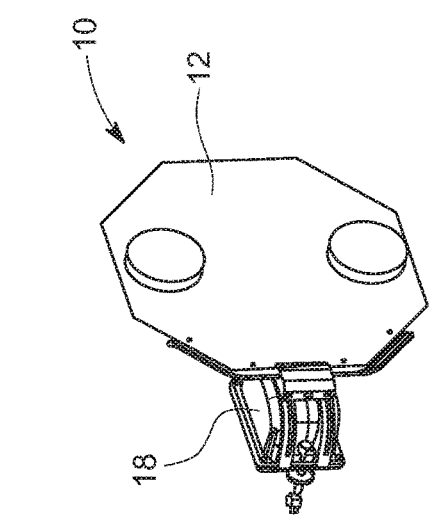
FIG. 3A
FIG. 3B
FIG. 3C
FIG. 3D

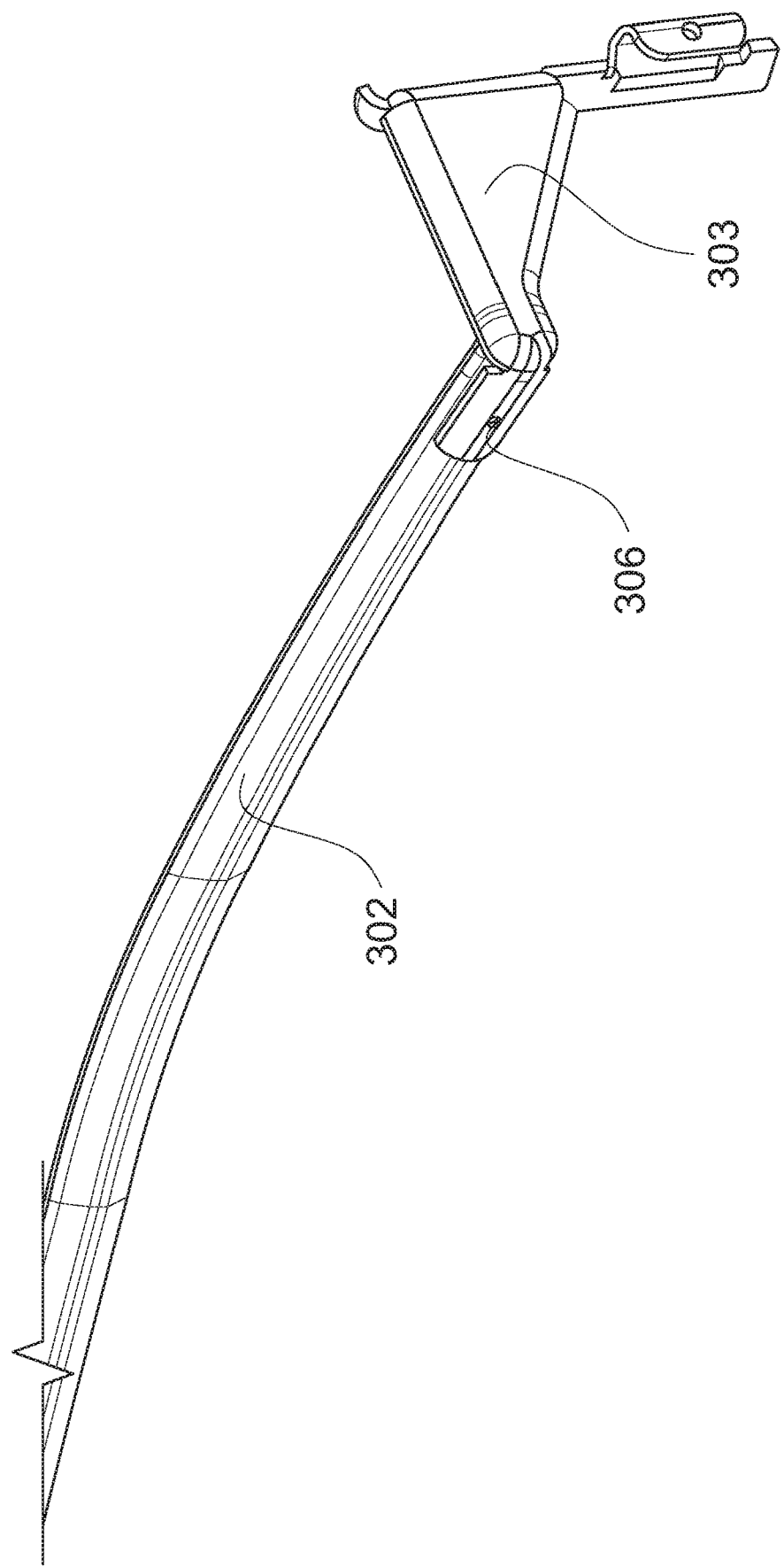

STOP SIGN AND CROSSING ARM ASSEMBLIES FOR SCHOOL BUSES, STOP SIGNS FOR STOP SIGN ASSEMBLIES, AND ATTACHMENT SYSTEM FOR CONNECTING STOP SIGNS TO STOP SIGNS ASSEMBLIES

CROSS-REFERENCE TO RELATED APPLICATIONS

This application claims the benefit of U.S. Provisional Application No. 62/902,629, filed Sep. 19, 2019, the disclosure of which is hereby incorporated in its entirety by reference herein.

TECHNICAL FIELD

The present invention relates to stop sign and crossing arm assemblies for vehicles such as school buses.

BACKGROUND

Stop sign assemblies may be used with vehicles such as school buses. A stop sign assembly may include an actuator, a "stop" sign (or arm), mechanical components, and a housing. The actuator and the mechanical components are housed within the housing. The housing is to be mounted to the school bus to thereby mount the stop sign assembly to the school bus. The mechanical components connect the actuator to the stop sign such that the stop sign moves between stowed and deployed positions as the actuator is driven. In the stowed position, the stop sign is tucked against the housing and generally lies in parallel with the school bus to be understood as not being in use. In the deployed position, the stop sign extends out and generally perpendicular away from the school bus to signal nearby vehicles to "stop".

Crossing guard arm assemblies are also used with vehicles such as school buses. A crossing arm assembly is like a stop sign assembly but includes a crossing guard arm having a relatively large length in place of a stop sign. When deployed, the crossing guard arm extends out in front of the school bus to be a physical barrier causing children using the bus to walk out far enough in front of the bus for the bus driver to be able to view.

SUMMARY

An object of the present invention is stop sign assemblies in which the actuator of a stop sign assembly may be either an electric motor actuator or a pneumatic actuator that are substitutable with one another to form the stop sign assembly and in which the stop sign assembly otherwise includes the same housing, the same stop sign, and the same mechanical components connecting the actuator to the stop sign regardless of Whether the electric motor or the pneumatic motor is provided as the actuator.

Another object of the present invention is crossing guard arm assemblies in which the actuator of a crossing guard assembly may be either an electric motor actuator or a pneumatic actuator that are substitutable with one another to form the crossing guard assembly and in which the crossing guard assembly otherwise includes the same housing, the same crossing guard arm and the same mechanical components connecting the actuator to the crossing guard arm regardless of whether the electric motor or the pneumatic motor is provided as the actuator.

Another object of the present invention is stop signs or arms for stop sign assemblies and other signage for similar assemblies.

Another object of the present invention for a stop sign assembly having a stop sign, mechanical components, and an actuator in which the mechanical components are connected to the actuator is an attachment configuration for attaching the stop sign to the mechanical components to thereby connect the stop sign to the actuator via the mechanical components whereby the stop sign moves between stowed and deployed positions as the actuator is driven.

In carrying out at least one of the above and/or at least one other object, the present invention provides an assembly including a common parts sub-assembly, an actuator, a physical appendage, and a mounting bracket. The common parts sub-assembly includes a rotor bracket and a housing. The actuator is connected to the rotor bracket to cause the rotor bracket to rotate during actuation of the actuator. The actuator and the rotor bracket connected thereto are housed within the housing. The mounting bracket connects the physical appendage to the rotor bracket whereby the physical appendage moves between a stowed position and a deployed position during actuation of the actuator. The actuator is either an electric motor actuator or a pneumatic actuator that are substitutable with one another to assemble the assembly without modification to any of the common parts sub-assembly and the physical appendage.

In one variation, the actuator is the electric motor actuator. The electric motor actuator includes an electric motor and an actuator housing. The electric motor is operatively received within the actuator housing and the actuator housing and the rotor bracket are operatively connected to connect the electric motor actuator to the rotor bracket to cause the rotor bracket to rotate during actuation of the electric motor actuator.

The electric motor actuator may further include a controller for controlling the electric motor. The controller has at least one Hall effect sensor for use in monitoring operation of the electric motor in controlling the electric motor. The electric motor may be a gear motor having a lead screw.

In another variation, the actuator is the pneumatic actuator. The pneumatic actuator includes a spring-loaded pushrod, an air bladder, and an actuator housing. The spring-loaded pushrod and the air bladder are operatively received within the actuator housing and the actuator housing and the rotor bracket are operatively connected to connect the pneumatic actuator to the rotor bracket to cause the rotor bracket to rotate during actuation of the pneumatic actuator.

The pneumatic actuator may further include an electromagnet to assist in restraining the rotor bracket to prevent unintentional deployment of the physical appendage. The electro-magnet may be energized when the physical appendage is in the stowed position and may be de-energized when the physical appendage is in the deployed position.

The pneumatic actuator may further include a dual action pressure relief valve. The dual action pressure relief valve is in operative arrangement for controlling air from an air source to the air bladder of the pneumatic actuator. The dual action pressure relief valve functions with the electro-magnet to be held open while the electro-magnet is being energized and to close while the electro-magnet is being de-energized.

The physical appendage may be either a stop sign or a crossing guard arm that are substitutable with one another to assemble the assembly without modification to any of the common parts sub-assembly and the actuator. The mounting bracket may be of a first type when the physical appendage is the stop sign and the mounting bracket may be of a second type when the physical appendage is the crossing guard arm.

The housing may be mounted to a vehicle. In this case, the physical appendage is tucked near the vehicle when the physical appendage is in the stowed position and extends out away from the vehicle when the physical appendage is in the deployed position. For example, the physical appendage may have a 90° deployment range between the stowed position and the deployed position.

The common parts sub-assembly may further include an electrical connector and the physical appendage may further include a corresponding electrical connector and the electrical connectors may be connected together for illuminators of the physical appendage to receive electricity.

The assembly may be for a school bus with the housing being mountable to the school bus.

In carrying out at least one of the above and/or at least one other object, the present invention provides an assembly including a rotor bracket, an actuator, a housing, a physical appendage, and a mounting bracket. The actuator is connected to the rotor bracket to cause the rotor bracket to rotate during actuation of the actuator. The actuator with the rotor bracket connected thereto are housed within the housing. The mounting bracket connects the physical appendage to the rotor bracket whereby the physical appendage moves between stowed and deployed positions during the actuation of the actuator. The actuator is either an electric motor actuator or a pneumatic actuator that are substitutable with one another to assemble the assembly without modification to the rotor bracket, the housing, the physical appendage, or the mounting bracket.

The physical appendage may be either a stop sign or a crossing guard arm.

In carrying out at least one of the above and/or at least one other object, the present invention provides a sign assembly. The sign assembly includes a reflective panel, first and second sign panels, and a LED strip. The first and second sign panels sandwich the reflective panel. The first and second sign panels form a channel therebetween. The LED strip is positioned within the channel.

The first and second sign panels may be identical. The reflective panel may be white and the first and second sign panels may be clear PMMA (Polymethyl methacrylate) panels. The first and second sign panels may have letter embossments.

BRIEF DESCRIPTION OF THE DRAWINGS

Embodiments of the present invention are shown with reference to the following drawings introduced as follows:

FIGS. 3A, 3B, 3C, and 3D respectively illustrate exploded, front isometric, rear isometric, and sectional views of a stop sign assembly in accordance with first embodiments of the present invention;

FIGS. 20A, 20B, 20C, and 20D illustrate respective views of the crossing guard arm assembly and components thereof;

DETAILED DESCRIPTION

Detailed embodiments of the present invention are disclosed herein however, it is to be understood that, the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
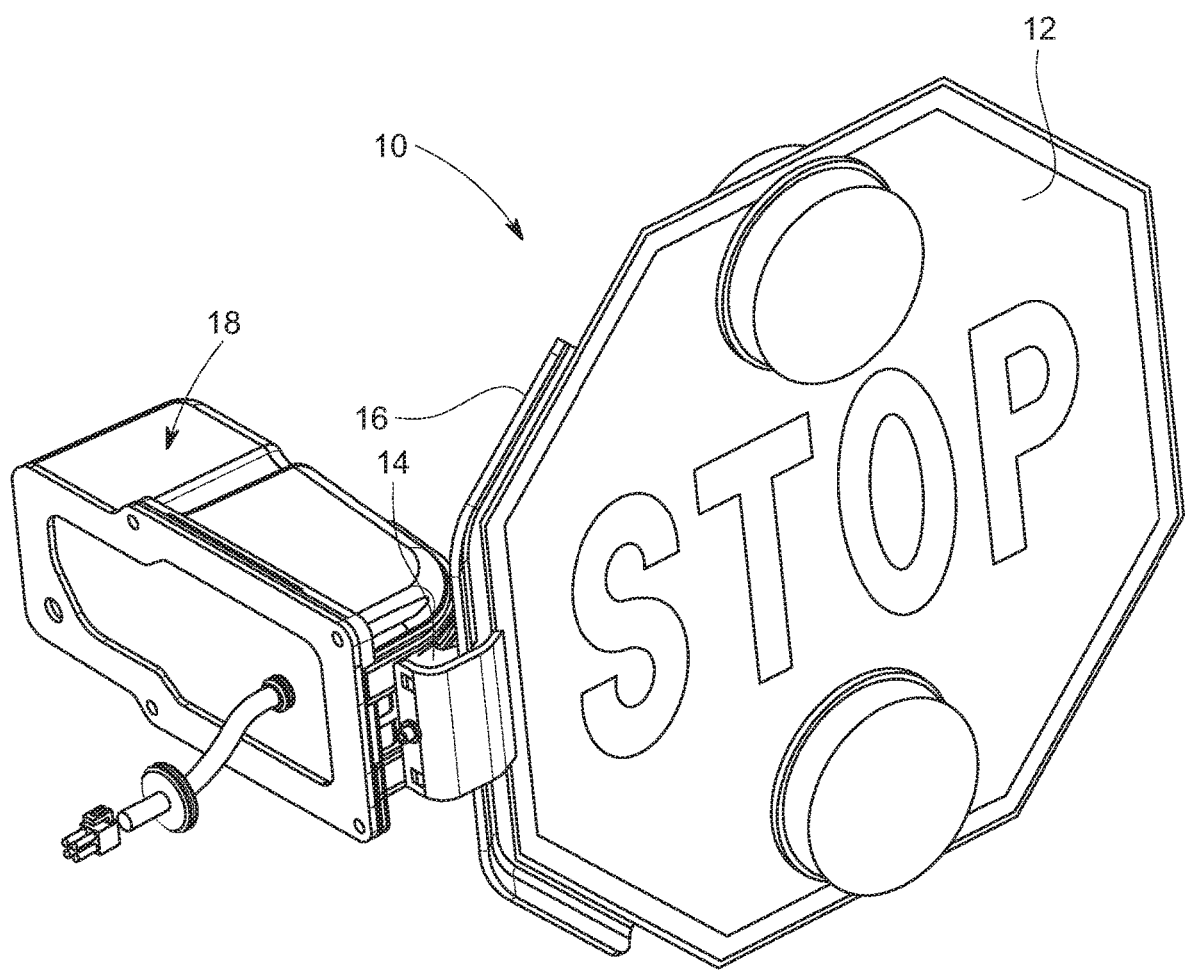
FIGS. 1A and 1B illustrate respective front and rear isometric views of a stop sign assembly in a deployed position in accordance with embodiments of the present assembly.
Figure 1B:
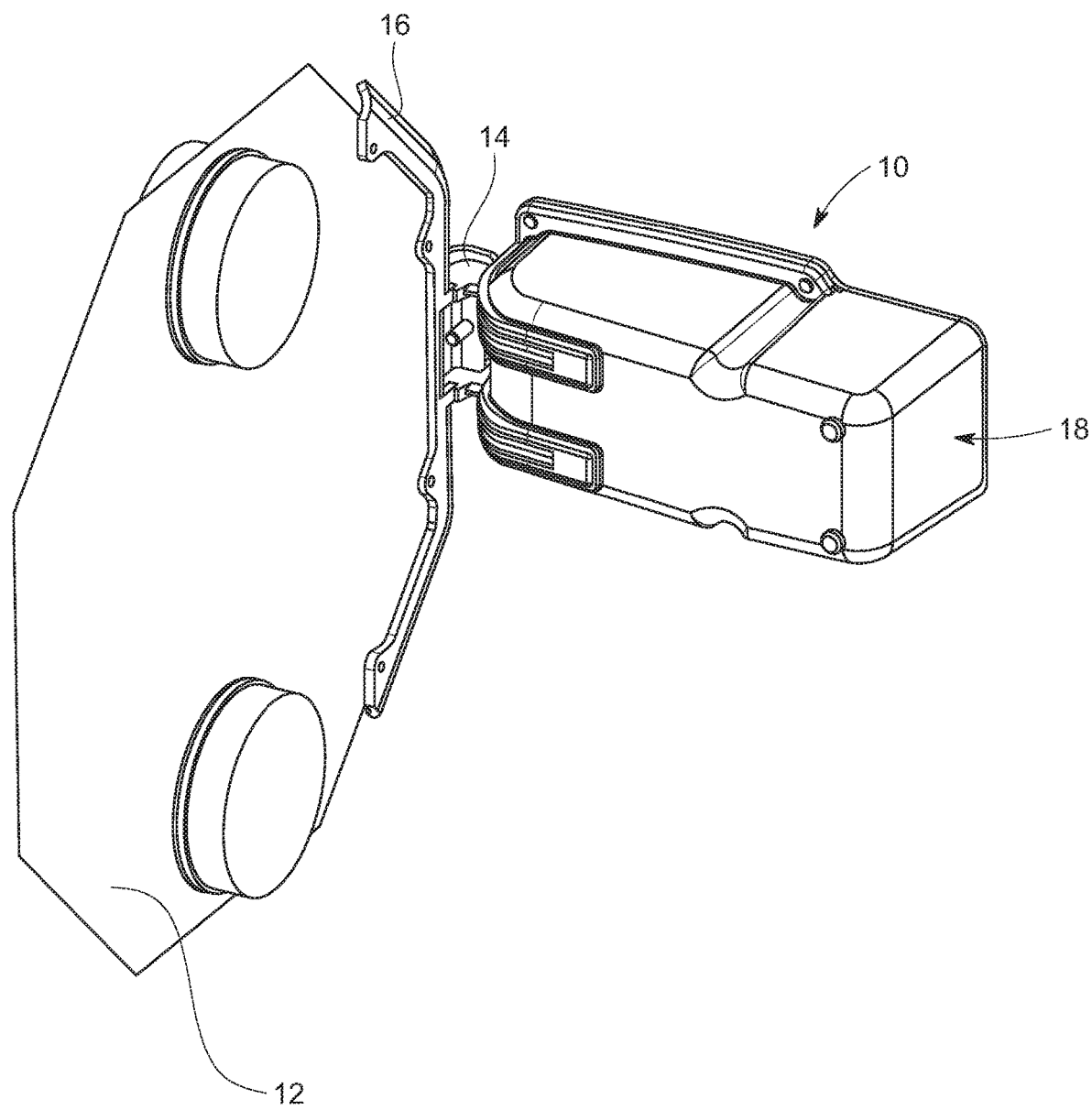
Figure 2:
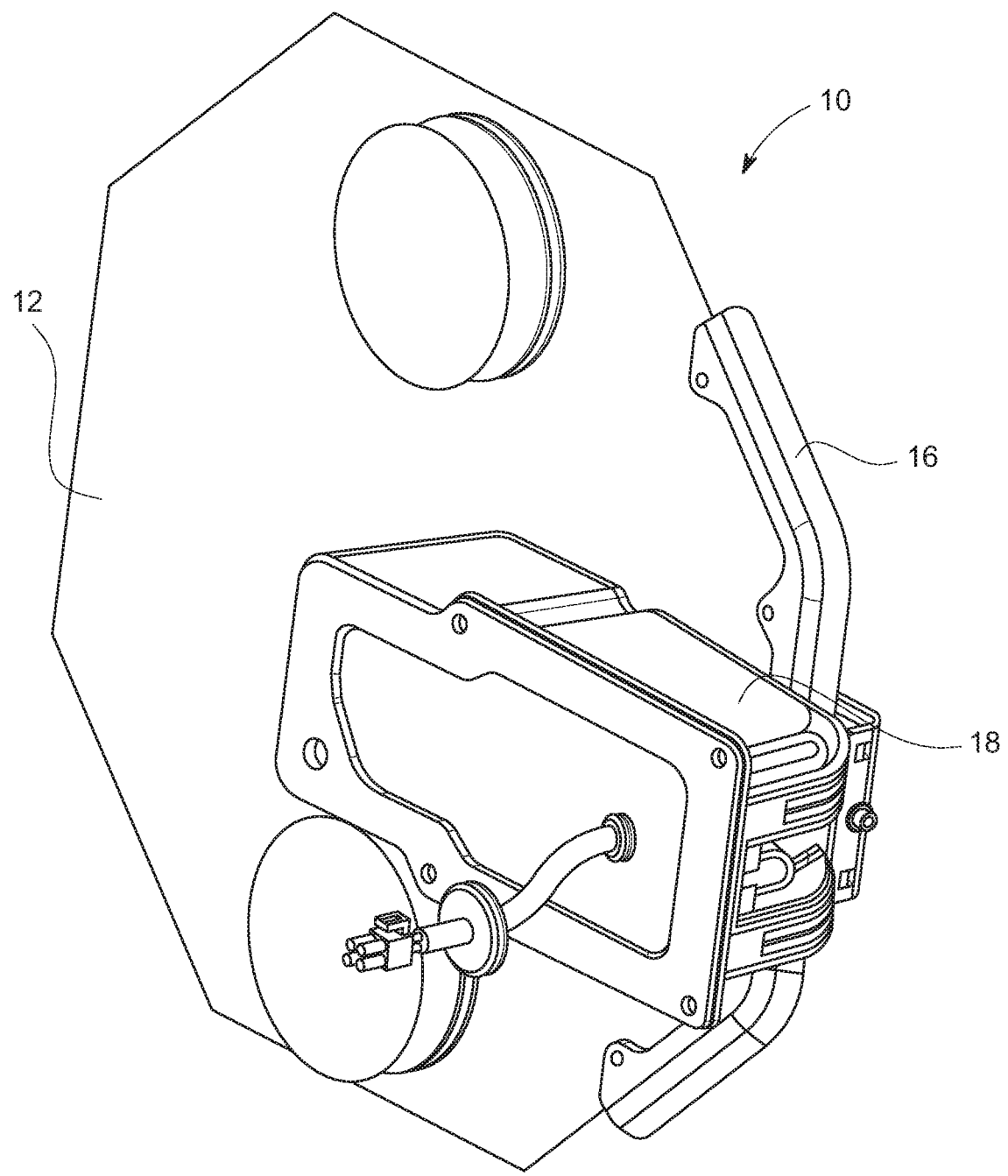
FIG. 2 illustrate a rear isometric view of the stop sign assembly in a stowed position in accordance with embodiments of the present invention.

Referring now to FIGS. 1A, 1B, and 2, a stop sign assembly 10 in accordance with embodiments of the present assembly is shown. FIGS. 1A and 1B illustrate respective front and rear isometric views of stop sign assembly 10 in a deployed position. FIG. 2 illustrates a rear isometric view of stop sign assembly 10 in a stowed position.

Stop sign assembly 10 generally includes an actuator (not shown), a physical appendage such as a "stop" sign (or arm) 12 ("stop sign"), mechanical components including a rotor bracket 14 and a mounting bracket 16, and a housing 18. The actuator, rotor bracket 14, and some of the mechanical components are housed within housing 18. Housing 18 is mountable to a vehicle such as a school bus (not shown) to thereby mount stop sign assembly 10 to the school bus. Mounting bracket 16 connects stop sign 12 to rotor bracket 14. Some of the mechanical components connect the actuator to rotor bracket 14. Actuation of the actuator causes rotor bracket 14 to rotate. Mounting bracket 16 rotates as rotor bracket 14 rotates. Consequently, stop sign 12, connected to mounting bracket 16, moves between the stowed and deployed positions as the actuator is driven.

In the deployed position, shown in FIGS. 1A and 1B, stop sign 12 extends out and generally perpendicular away from housing 18 to signal nearby vehicles to "stop". In the stowed position, shown in FIG. 2, stop sign 12 is tucked against housing 18 and generally lies in parallel there against to be understood as not being in use.

As background, stop sign assemblies ordinarily have similar but different constructions for each application, e.g., one construction for electric motor actuator operation and another construction for pneumatic actuator operation. As described in further detail below, in accordance with embodiments of the present invention, the mechanisms are consolidated into a common housing and there are several other common parts.

The electric motor is a primary failure mode in ordinary stop sign assemblies. This may be for several reasons like oscillation and vibrations and other mechanical stresses. Ordinarily, a direct drive servo motor is used as the electric motor. The shaft of the motor is the axis of rotation of the stop sign. Thus, when the stop sign is stressed by wind or vibration, any uncontrolled movement is back fed directly into the motor. The motor is a self-position arrangement, so its holding force is all that controls the stowed or deployed positions. It can be manually pulled out of position and as long as there is power, it will correct to the intended position. The gears inside the servo motor are being damaged because of the environmental inputs. There may be other reasons for short lifespan of the motor.

As described in further detail below, in accordance with embodiments of the present invention, the electric motor is a gear motor with an integrated lead screw (i.e., gear motor lead screw and gear train or gear box). The electric motor is "decoupled" from the environmental forces. The intent is to eliminate reversing forces into the motor and ensure lower stresses in the motor and longer life. The screw cannot be back driven because of unintended forces. The pitch of the screw is a controlling factor for the torque and speed adjustments to the mechanism. The "backloads" are absorbed at the captured nut on the lead screw and transferred into non-axial or side loads on the screw. This makes the positioning a positive displacement, eliminating or reducing unintended positional changes to the sign. The lead screw arrangement also multiplies the forces that the motor can generate. So available forces to move the stop sign will be much higher than what typical stop sign assemblies can generate. Longer functional lifespan is more likely with our arrangement.

As described in further detail below, in accordance with embodiments of the present invention, the pneumatic versions have notable features other than some common parts. The return spring is as large as our package will allow. This spring is larger so regardless of the engineered output force, it has the likely hood to be more reliable without fade of the forces over time.

Referring now to FIGS. 3A, 3B, 3C, and 3D, exploded, front isometric, rear isometric, and sectional views of a common parts module sub-assembly 11 of a stop sign assembly 10 in accordance with first embodiments of the present invention are respectively shown. Common parts module sub-assembly 11 includes the parts of stop sign assembly 10 that are a part of stop sign assembly 10 regardless of whether the actuator is an electric motor actuator or a pneumatic actuator. That is, common parts module sub-assembly 11 includes the "common parts" which are present in all variations (electric motor actuator vs. pneumatic actuator) of stop sign assembly 10.

Common parts module sub-assembly 11 includes stop sign 12, mechanical components including rotor bracket 14 and sign mounting bracket 16, and housing 18. Rotor bracket 14 may be made of metal, mounting bracket 16 may be made of steel, and housing 18 may be a composite. Common parts module sub-assembly 11 further includes rear closeout panel (i.e., a metal back cover) 22 and an associated foam gasket 23. Rear closeout panel 22 is an integral part of stop sign assembly 10 and is attached to housing 18 prior to installation of stop sign assembly 10 on a vehicle such as a school bus.

As described above with reference to FIGS. 1 and 2, stop sign 12 is to be connected to the actuator for the stop sign to be movable between the stowed and deployed positions in response to actuation of the actuator. In this regard, stop sign 12 is connected to mounting bracket 16, mounting bracket 16 is connected to rotor bracket 14, and rotor bracket 14 is connected to the actuator. Actuation of the actuator causes rotor bracket 14, connected to the actuator, to rotate which causes mounting bracket 16, connected to rotor bracket 14, to rotate which causes stop sign 12, connected to mounting bracket 16, to rotate between stowed and deployed positions.

The mechanical components of common parts module assembly 11 include other mechanical components for establishing the mechanical connections between rotor bracket 14 and mounting bracket 16. As shown in FIG. 3A, these other mechanical components include a metal pin tube 25a, a steel roller pin 25b, bronze bushings 25c, bronze rollers 25d, flanged lock nuts 25e, and collard studs 25f. These other mechanical components further include a metal clamp bracket 27a and an associated mounting screw 27b. Clamp bracket 27a is used for clamping rotor bracket 14 and mounting bracket 16 together. In this regard, mounting bracket 16 includes a flange 17 to which clamp bracket 27a is mounted to and secured thereto by mounting screw 27b. In a more preferred variation, clamp bracket 27a and mounting screw 27b are replaced with collard studs and locknuts. As such, in this more preferred variation, no clamps are used.

As further shown in FIG. 3A, common parts module sub-assembly 11 includes additional parts associated with housing 18. These additional parts include auxiliary seals 29a and rubber bumpers 29b. Common parts module subassembly 11 further includes an electrical connector 31 for connecting to a corresponding electrical connector 33 of stop sign. Electrical connectors 31 and 33 are connected for electricity to be supplied to stop sign 12 for powering signal lamps 34 or other illuminators of stop sign 12.

As described, common parts module sub-assembly 11 is comprised of the parts that are used in all variations of stop sign assembly 10. These common parts include outer housing 18, rotor bracket 14, roller (pivot) pin 25b, seals, and attachment features. Housing 18 uses metal back cover 22 which adds significant structure to stop sign assembly 10. The electrical connector interface incorporated into housing 18 for stop sign 12 can be installed at some time after the stop sign 12 is installed.

Figure 4:
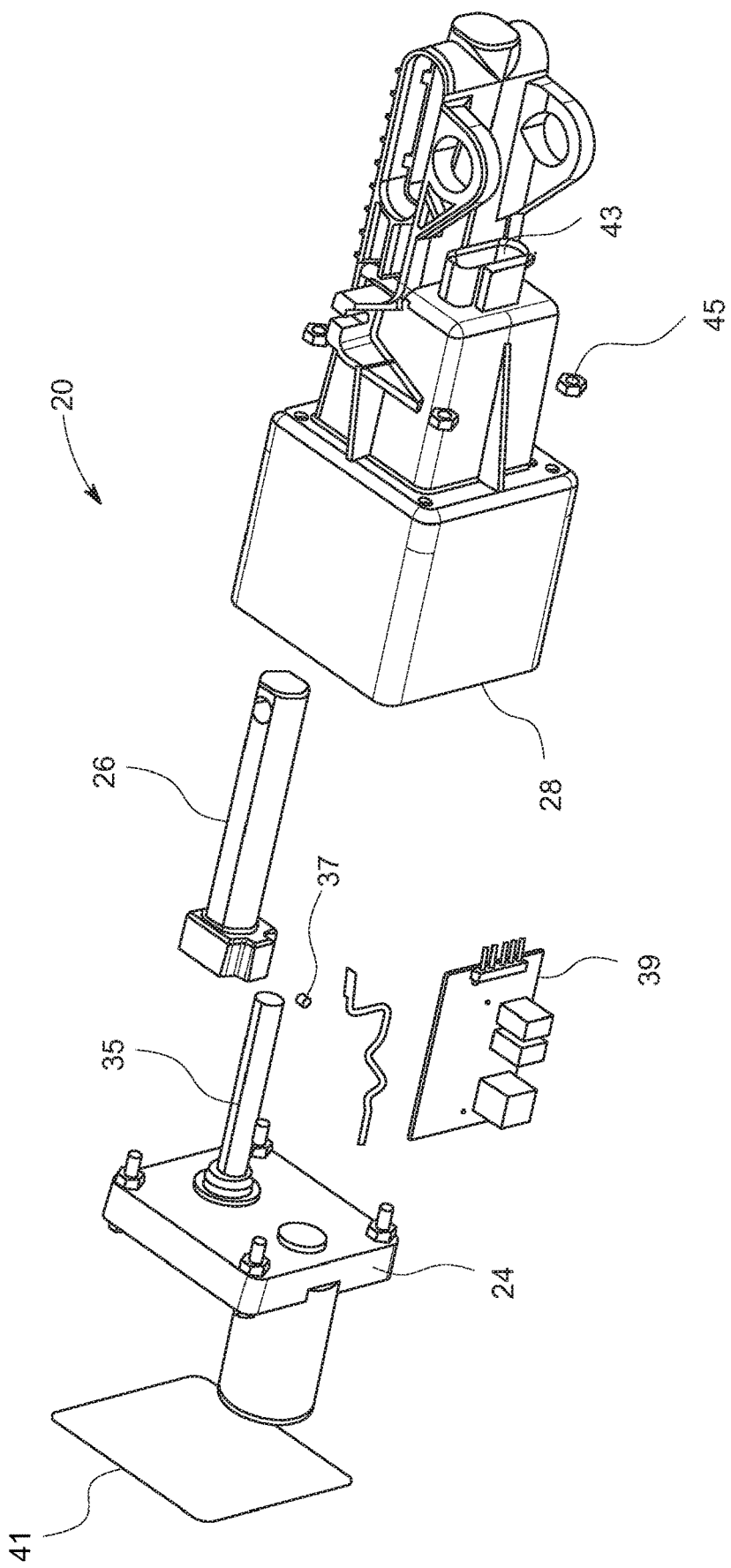
FIG. 4 illustrates an exploded view of an electric motor actuator of the stop sign assembly in accordance with the first embodiments of the present invention.
Figure 5:
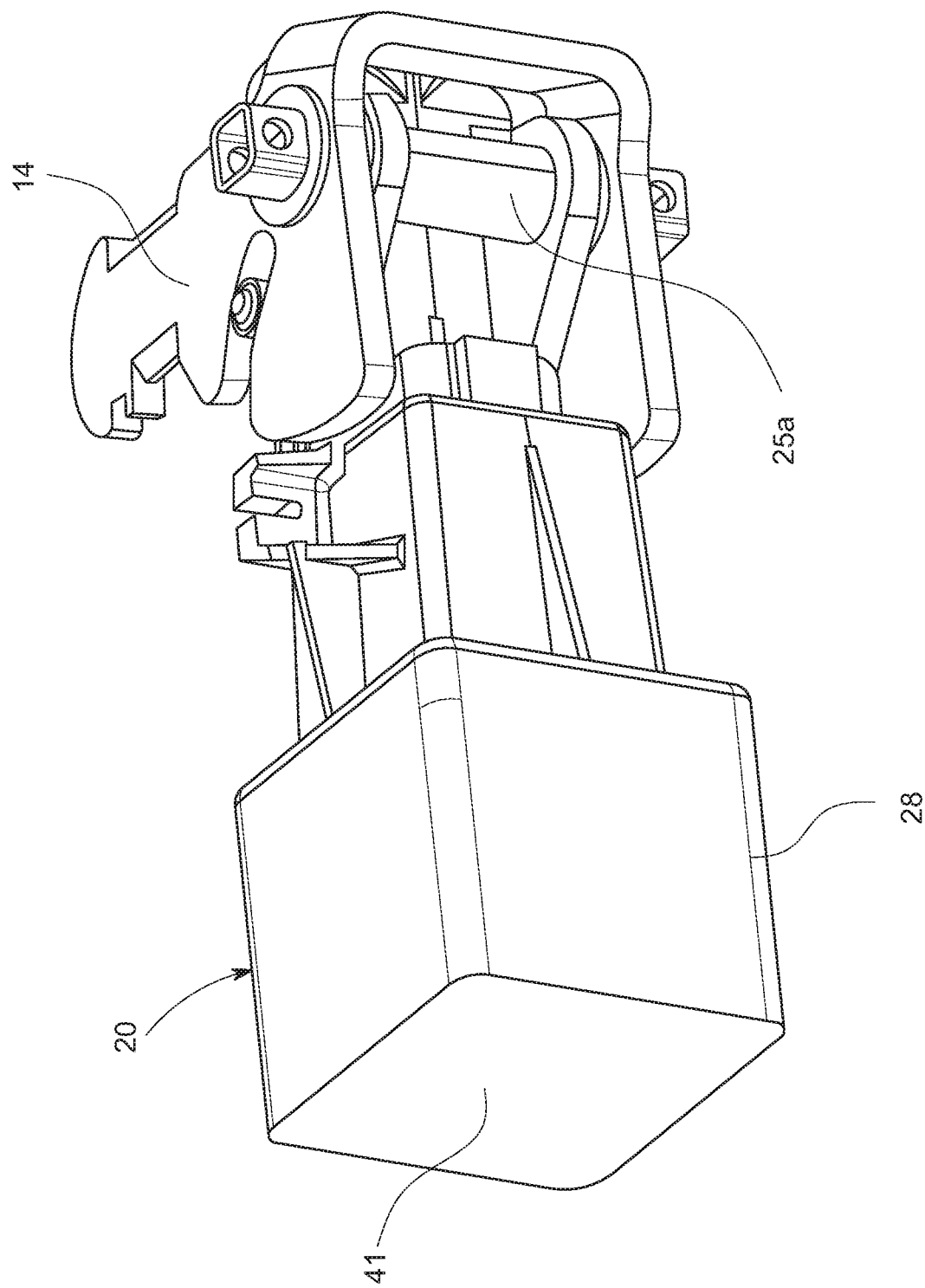
FIG. 5 illustrates the electric motor actuator and the rotor bracket of the stop sign assembly connected together.
Figure 7:
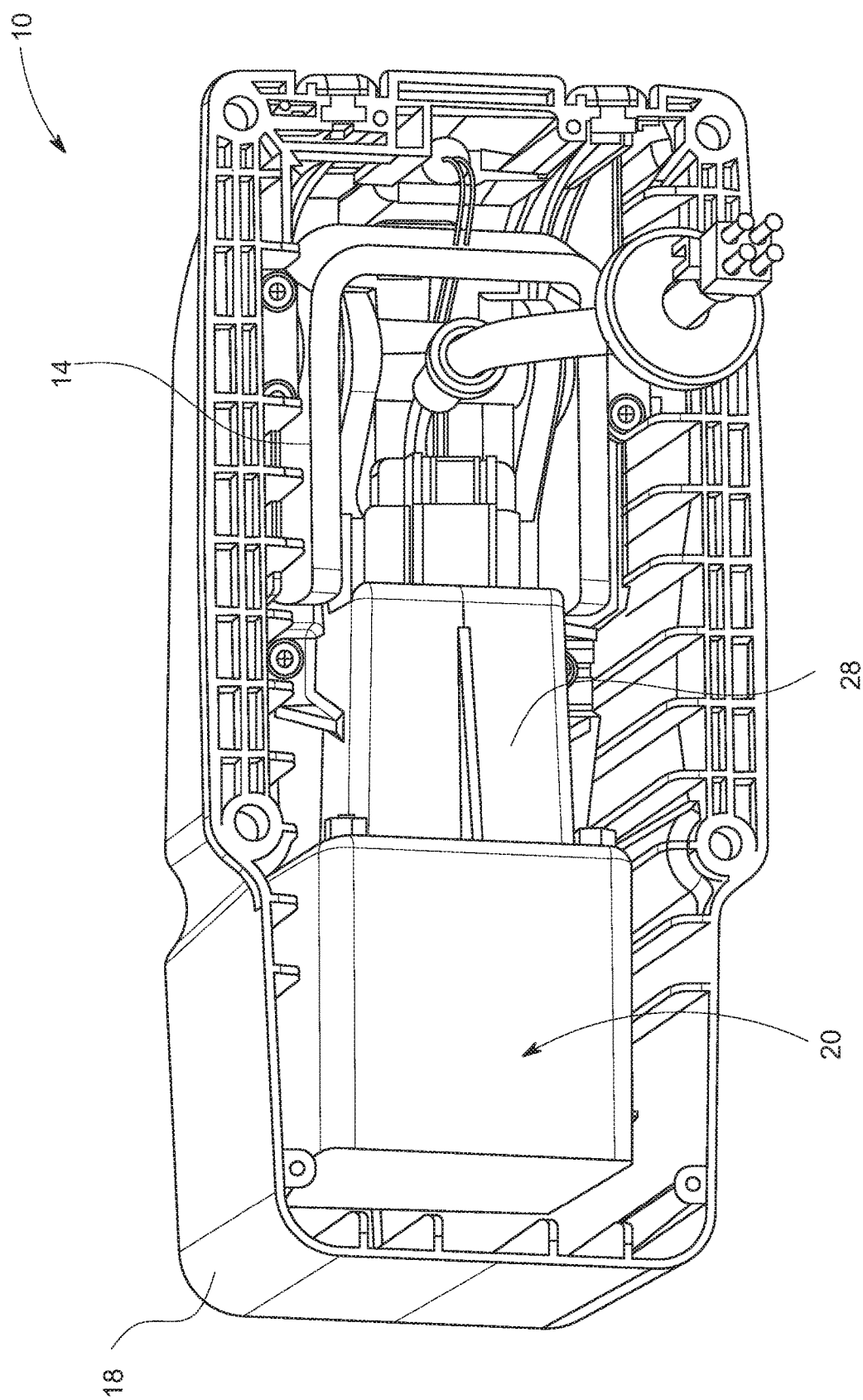
FIG. 7 illustrates the electric motor actuator with the rotor bracket installed in the housing.

Referring now to FIGS. 4, 5, 7, and 7, an electric motor actuator 20 of stop sign assembly 10 in accordance with the first embodiments of the present invention are shown. FIG. 4 illustrates an exploded view of electric motor actuator 20. Electric motor actuator 20 includes an electric motor 24, an actuator tube 26, an actuator housing 28, and an electronic controller 39. Electric motor 24 is a gear motor having a lead screw 35. Lead screw 25 (size NEMA23) can be made more resistant and its thread pitch controls speed and force. Actuator tube 26 connects to lead screw 35. Actuator tube 26 has an associated trigger magnet 37. Electric motor 24 with actuator tube 26 are inserted into actuator housing 28.

A rear closeout panel 41, such as an adhesive back film, seals electric motor 24 and actuator tube 26 within actuator housing 28. Actuator housing 28 has an electric connector interface 43. Actuator housing 28 has associated motor mount nuts 45.

Electric motor actuator 20 is a linear actuator which uses lead screw 35 and a gear motor (i.e., electric motor 24) and actuator tube 26 with trigger magnet 37 which provide ample force potential to move stop sign 12. This arrangement minimizes any possible back driving of electric motor 24 from unintended oscillations of stop sign 12. It is a positive displacement mechanism that only allows movement of stop sign 12 when electric motor 24 is energized. This additionally provides a longer motor life.

Electronic controller 39 controls electric motor 24 to position stop sign 12 where intended. Electronic controller 39 uses Hall effect sensors for handling its controller operations. In one variation, electronic controller 39 has a mechanical relay-based PCB (printed circuit board), using two Hall switches as limit switch for both positional margins. In another variation, electronic controller 39 has a processor-based PCB for programmability and uses one Hall switch for proximity only and uses current monitoring for shutoff. As described, electric motor actuator 20 has a custom-on board controller 39 with Hall effect positioning circuits. This is highly integrated to electric motor 24 and lead screw 35.

FIG. 5 illustrates electric motor actuator 20 and rotor bracket 14 of stop sign assembly 10 connected together. Particularly, electric motor 24 is operatively received within actuator housing 28 and actuator housing 28 and rotor bracket 14 are operatively connected together. As a result, actuation of electric motor 24 causes lead screw 35 to rotate which causes rotor bracket 14 to rotate to thereby move stop sign 12.

Figure 6:
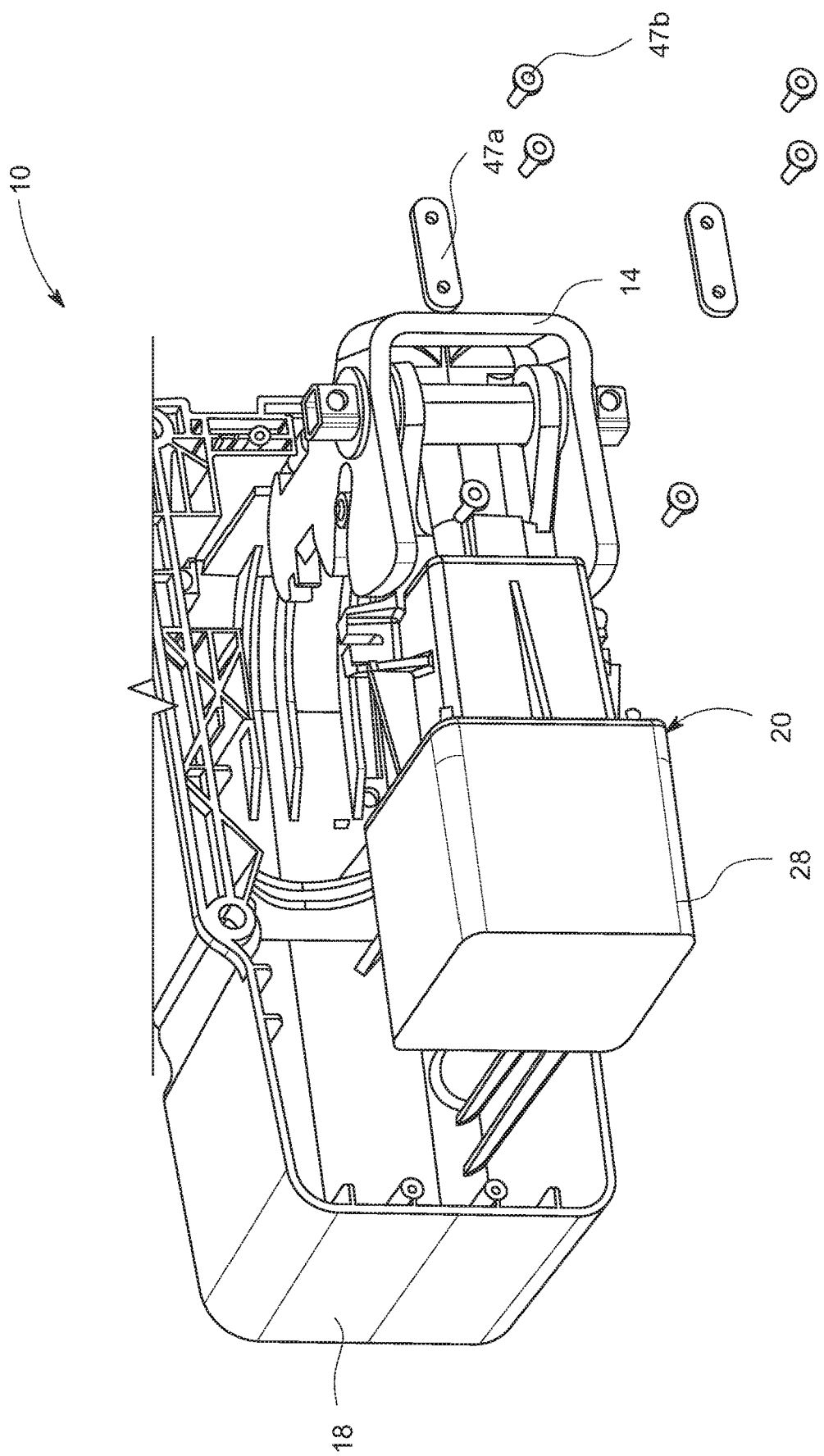
FIG. 6 illustrates a view depicting installation of the electric motor actuator and the rotor bracket into the housing of the stop sign assembly.

FIG. 6 illustrates a view depicting installation of electric motor actuator 20 and rotor bracket 14 into housing 18 of stop sign assembly 10. The install components for installing electric motor actuator 20 with rotor bracket 14 attached thereto into housing 18 include a pair of studs 47a and six mounting screws 47b. These install components are the same install components for installing the pneumatic actuator with rotor bracket 14 attached thereto into housing 18.

FIGS. 4, 5, and 6 illustrate sequential installation steps for assembling electric motor actuator 20 (FIG. 4), assembling the assembled electric motor actuator 20 with rotor bracket 14 (FIG. 5), and installing the assembled electric motor actuator 20 with rotor bracket 14 attached thereto into housing 18 (FIG. 6). FIG. 7 illustrates the finished assembly of assembled electric motor actuator 20 and rotor bracket 14 attached thereto received within housing 18, with a harness added.

Figure 8:
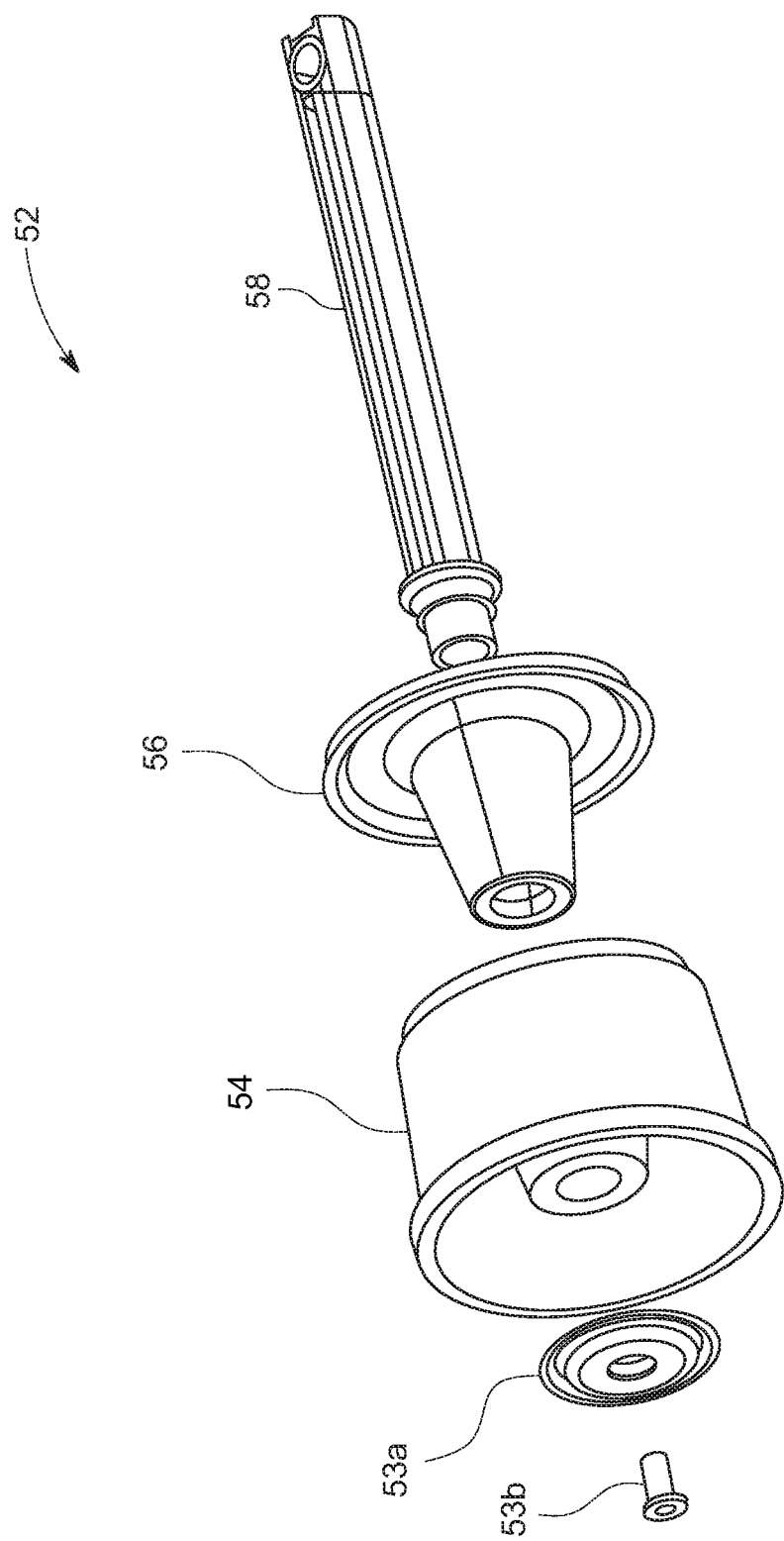
FIG. 8 illustrates an exploded view of a pushrod subassembly of a pneumatic actuator of the stop sign assembly in accordance with the first embodiments of the present invention.

Referring now to FIGS. 8, 9, 10, 11, and 12, a pneumatic actuator 50 of stop sign assembly 10 in accordance with the first embodiments of the present invention is shown. FIG. 8 illustrates an exploded view of a pushrod subassembly 52 of pneumatic actuator 50. Pushrod subassembly 52 includes a molded, stamped washer pushrod 53a with associated screw 53b, an air bladder 54, a molded nylon cup 56, an aluminum pushrod 58, and a return spring 60 (shown in FIG. 9).

Figure 9:
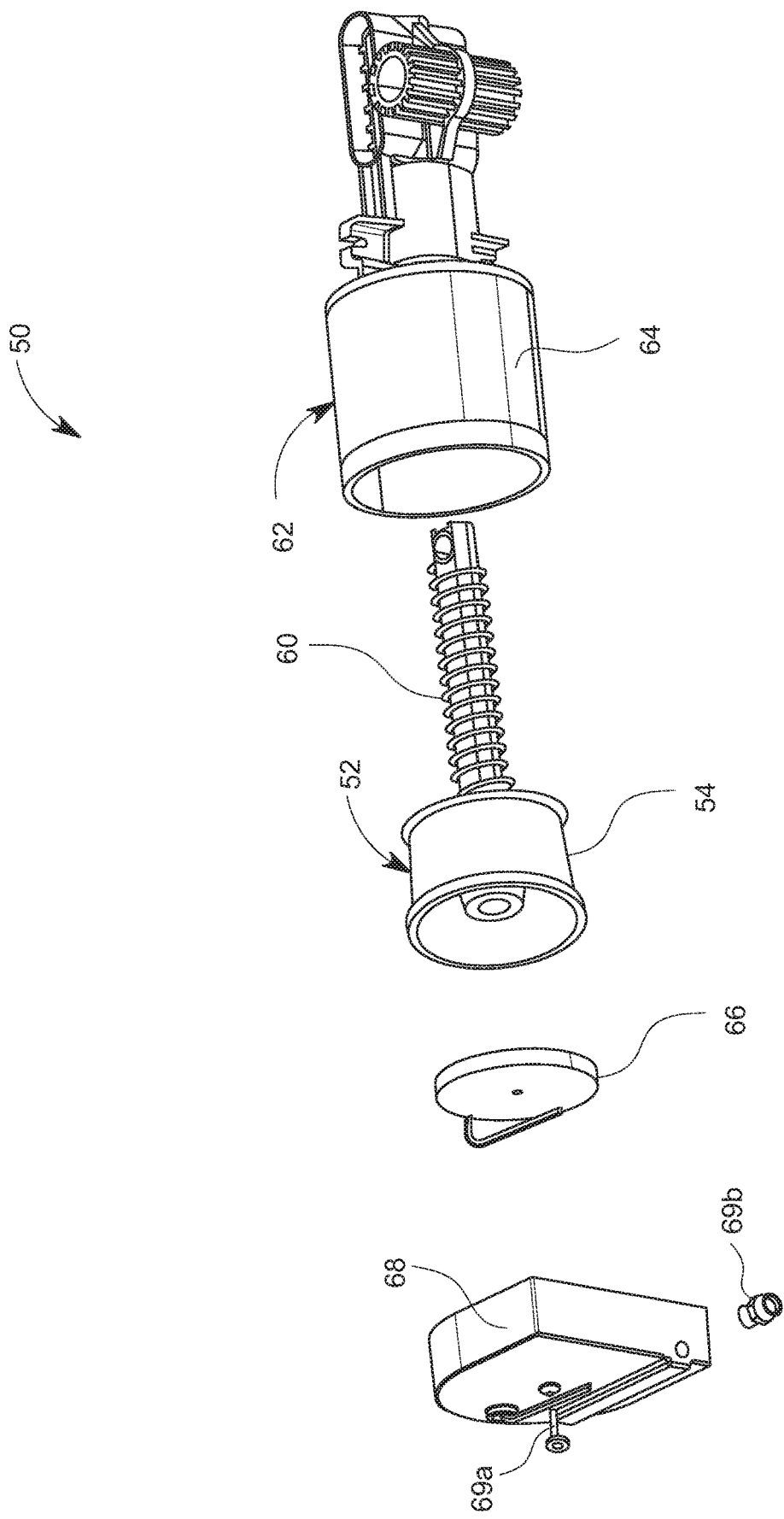
FIG. 9 illustrates an exploded view of the pneumatic actuator.

FIG. 9 illustrates an exploded view of pneumatic actuator 50 including the assembled pushrod assembly 52. Pneumatic actuator 50 further includes an actuator housing 62. Actuator housing 62 includes a guide tube 64. Guide tube 64 has an interior area for receiving pushrod subassembly 52 therein. Pneumatic actuator 50 further includes a stowage magnet 66 and an air inlet cover 68. Air inlet cover 68 has an associated screw 69a and NPT air fitting 69b. Magnet 66 is received within a receiving area of air bladder 54 and air inlet cover 68 seals pushrod assembly 52 within the interior area of guide tube 64. Air inlet cover 68 is bonded to guide tube 64.

Figure 10:
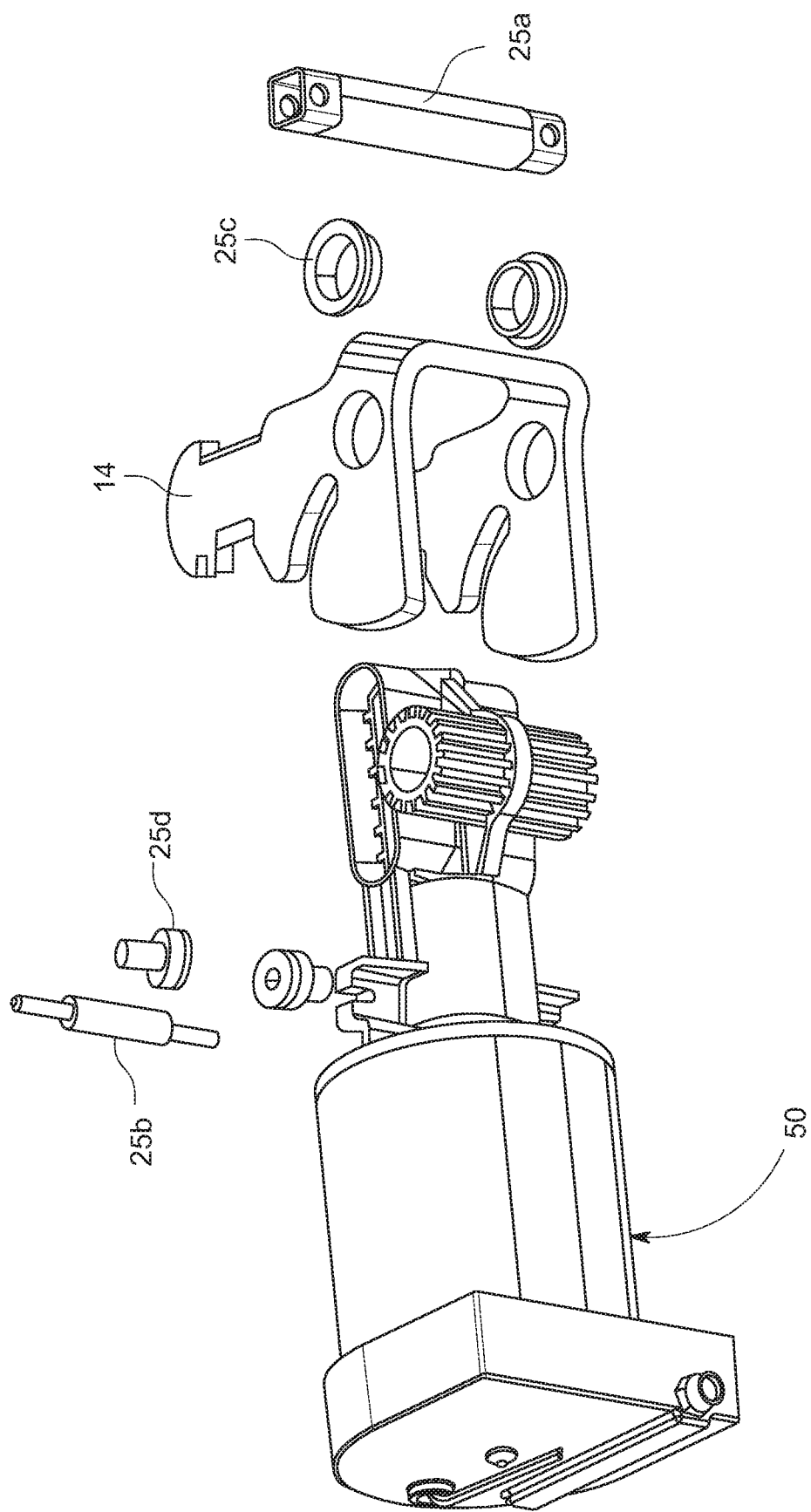
FIG. 10 illustrates an exploded view depicting connection of the pneumatic actuator with the rotor bracket.

FIG. 10 illustrates an exploded view depicting connection of pneumatic actuator 50 with rotor bracket 14. Pneumatic actuator 50 is shown in FIG. 10 as being assembled and thereby has the form of an air can sub-assembly. Particularly, pneumatic actuator 50 is assembled with pushrod subassembly 52 operatively received within actuator housing 62 and actuator housing 62 and rotor bracket 14 are to be operatively connected together. As a result of the operative connection between actuator housing 62 and rotor bracket 14, actuation of pushrod subassembly 52 causes rotor bracket 14 to rotate to thereby move stop sign 12.

Figure 11:
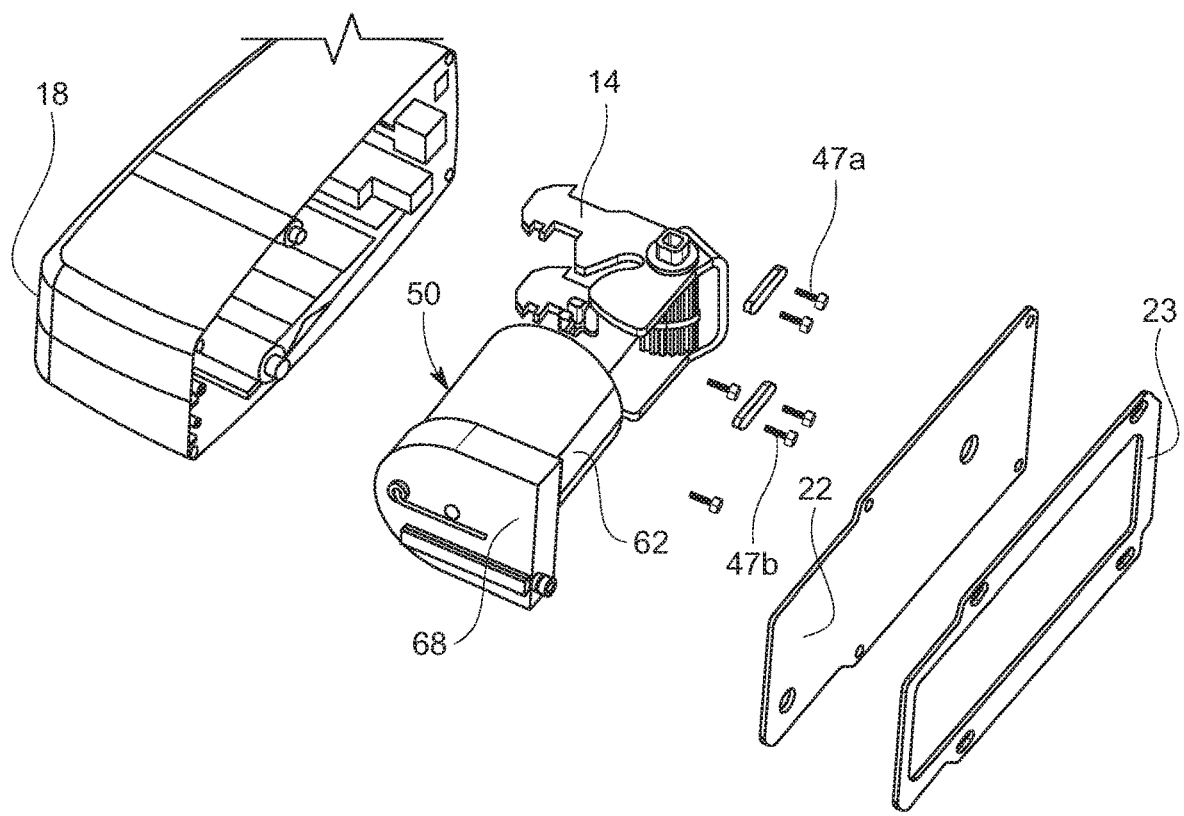
FIG. 11 illustrates a view depicting installation of the pneumatic actuator with the rotor bracket into the housing of the stop sign assembly.

FIG. 11 illustrates a view depicting installation of pneumatic actuator 50 with rotor bracket 14 attached thereto into housing 18 of stop sign assembly 10. The install components for installing pneumatic actuator 50 with rotor bracket 14 attached thereto into housing 18 include studs 47a and mounting screws 47b. As noted above, these install components are the same install components for installing electric motor actuator 20 with rotor bracket 14 attached thereto into housing 18.

Figure 12:
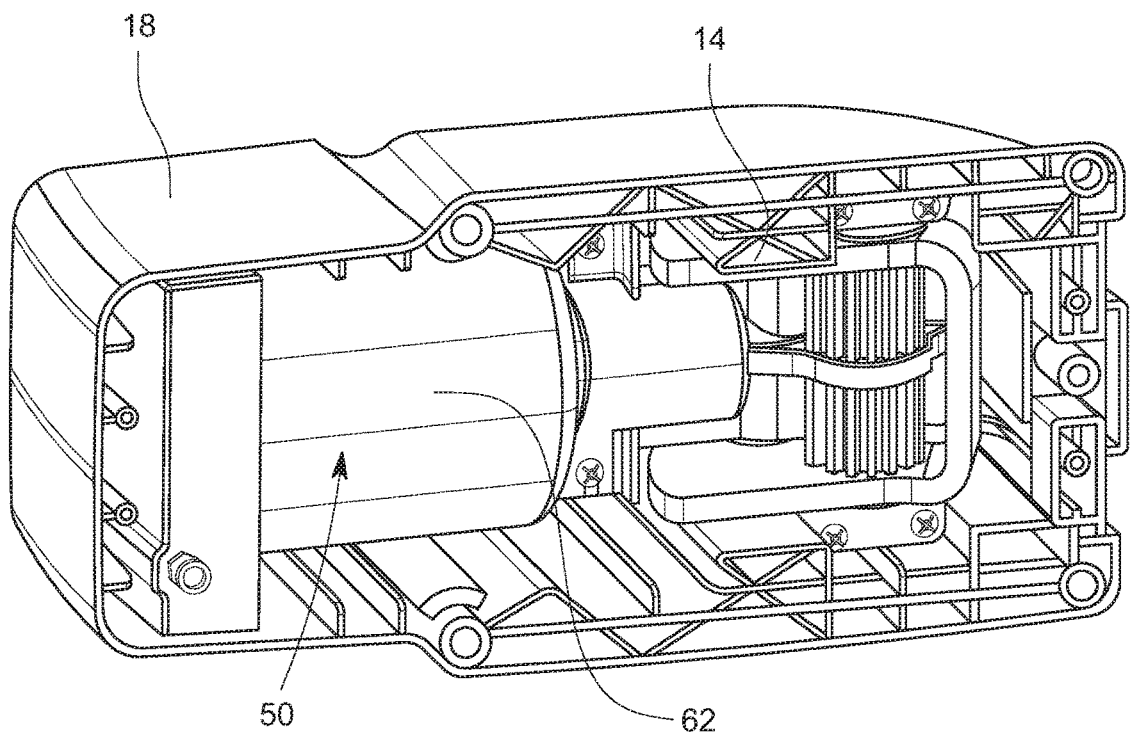
FIG. 12 illustrates the pneumatic actuator with the rotor bracket installed in the housing.

FIGS. 8, 9, 10, and 11 illustrate sequential installation steps for assembling pneumatic actuator 50 (FIGS. 8 and 9), assembling the assembled pneumatic actuator 50 with rotor bracket 14 (FIG. 10), and installing the assembled pneumatic actuator 50 with rotor bracket 14 attached thereto into housing 18 (FIG. 11). FIG. 12 illustrates the finished assembly of assembled pneumatic actuator 50 and rotor bracket 14 attached thereto received within housing 18.

In sum, pneumatic actuator 50 is a pressure-operated cannister that has a spring-load pushrod 58 that is displaced in linear fashion when air bladder 54 is pressurized. There is an integrated electro-magnet, i.e., stowage magnet 66, positioned within the cannister to add some ability to restrain stop sign 12 in the stowed position to prevent unintentional deploy from various forces. Magnet 66 is energized inversely to the electrical signal from the vehicle that signals deployment. As such, when stop sign 12 is stowed, magnet 66 is energized, and when stop sign 12 is signaled to deploy, magnet 66 is de-energized. Magnet 66 is also inverse to the pneumatic pressure cycle. As described, pneumatic actuator 50 has an integrated electro-magnet which provides stability to stop sign 12 during stowage and prevents inadvertent deployment of stop sign 12.

Figure 13:
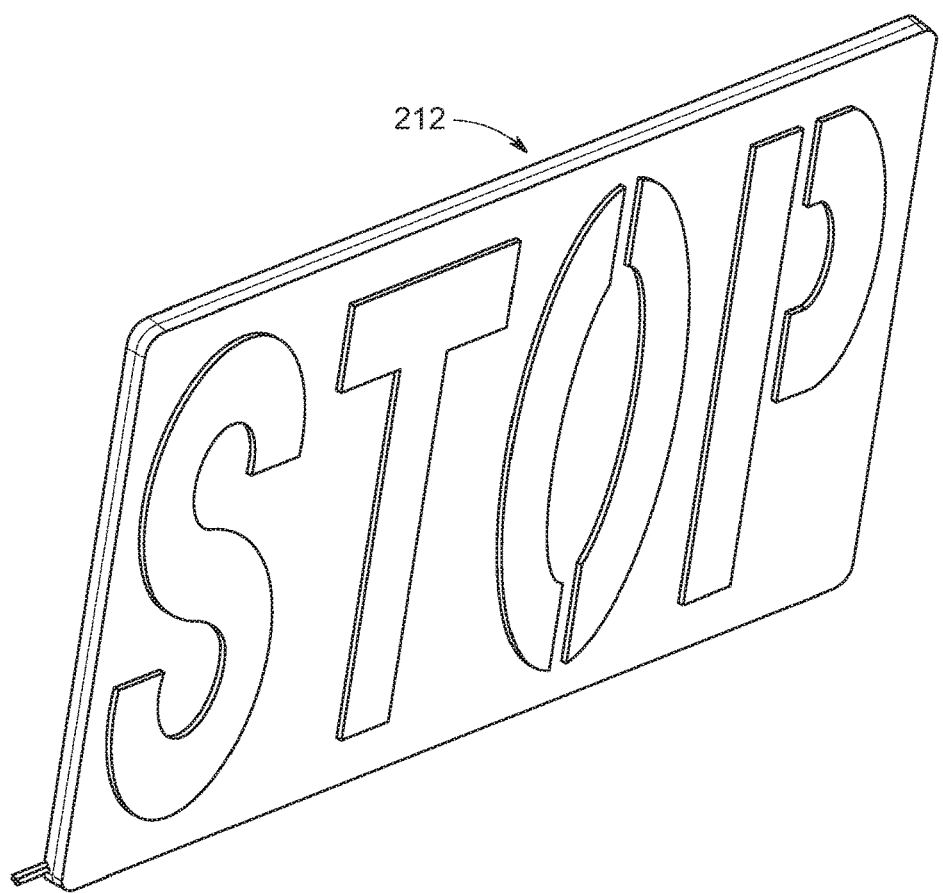
FIGS. 13, 14, 15, and 16 illustrate a sealed sign element sub-assembly of a stop sign in accordance with second embodiments of the present invention.
Figure 14:
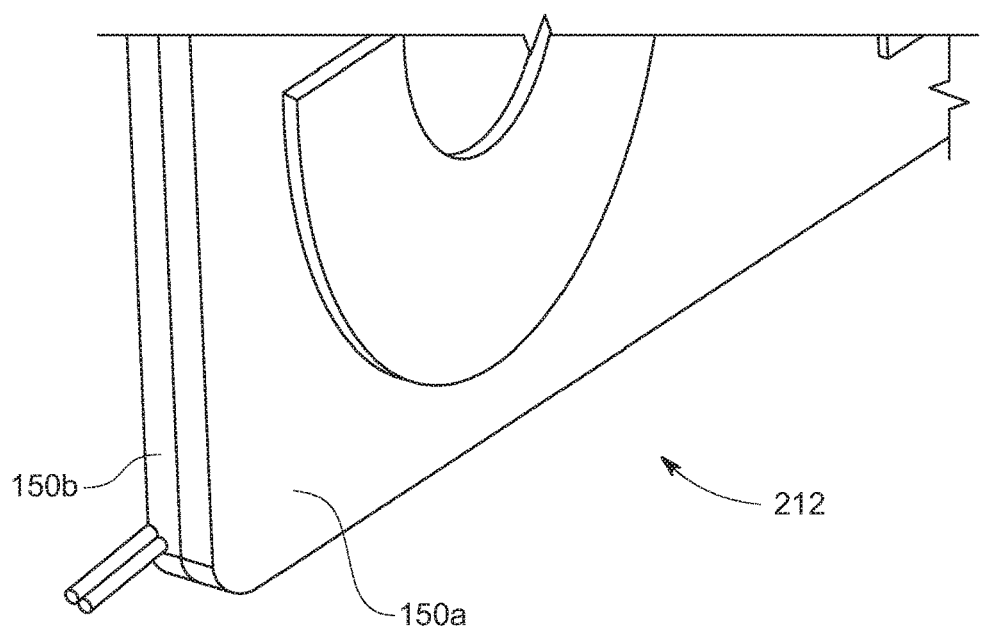

Referring now to FIGS. 13, 14, 15, and 16, a sealed sign element sub-assembly 212 of stop sign 12 in accordance with second embodiments of the present invention is shown. With reference to FIG. 13, the sign element is clear PMMA with red LED and white appearance of lettering when unlit. This represents a sealed disposable/replaceable lighting fixture. With reference to FIG. 14, the sealed sign element sub-assembly includes two clear PMMA molded panels 150a and 150b using one design twice (i.e., two identical panels). Wires exit at small slot which allows easy sealing.

Figure 15:
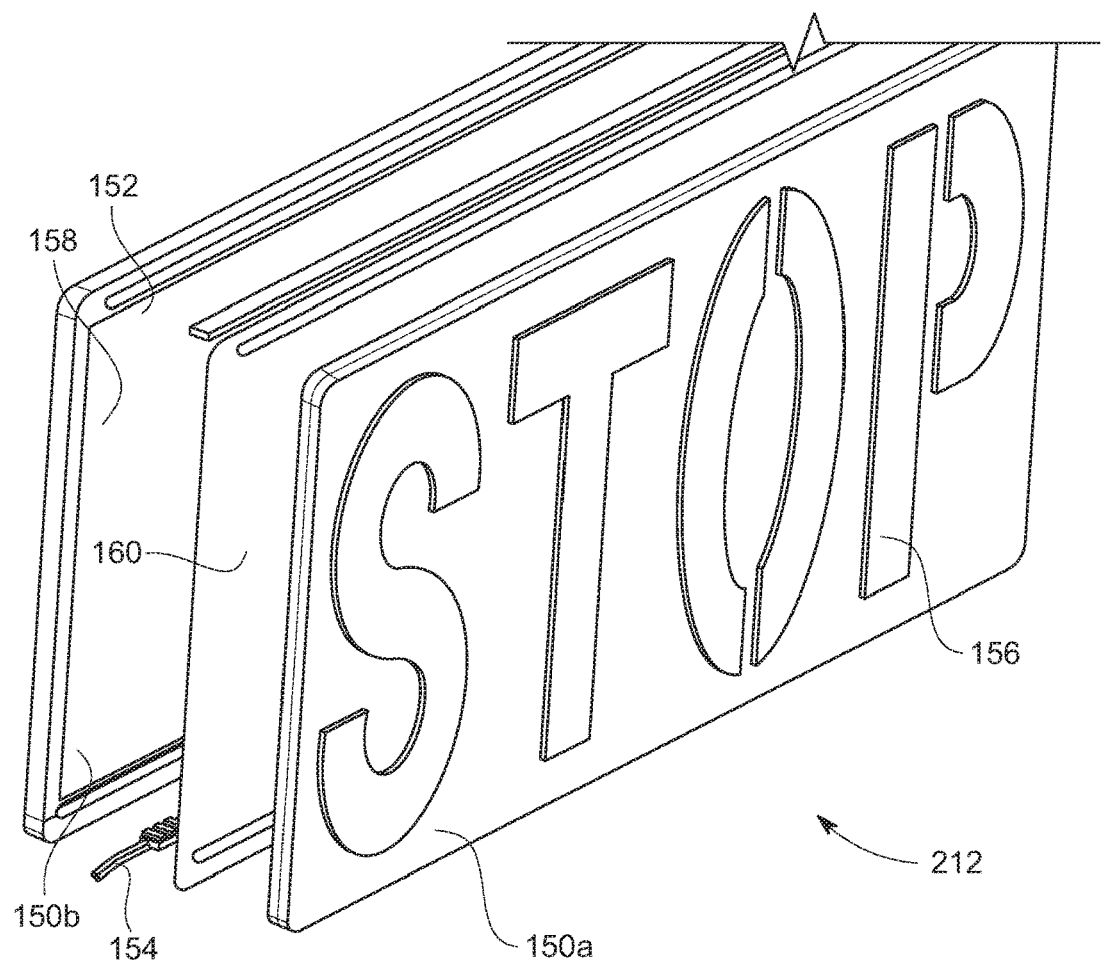
Figure 16:
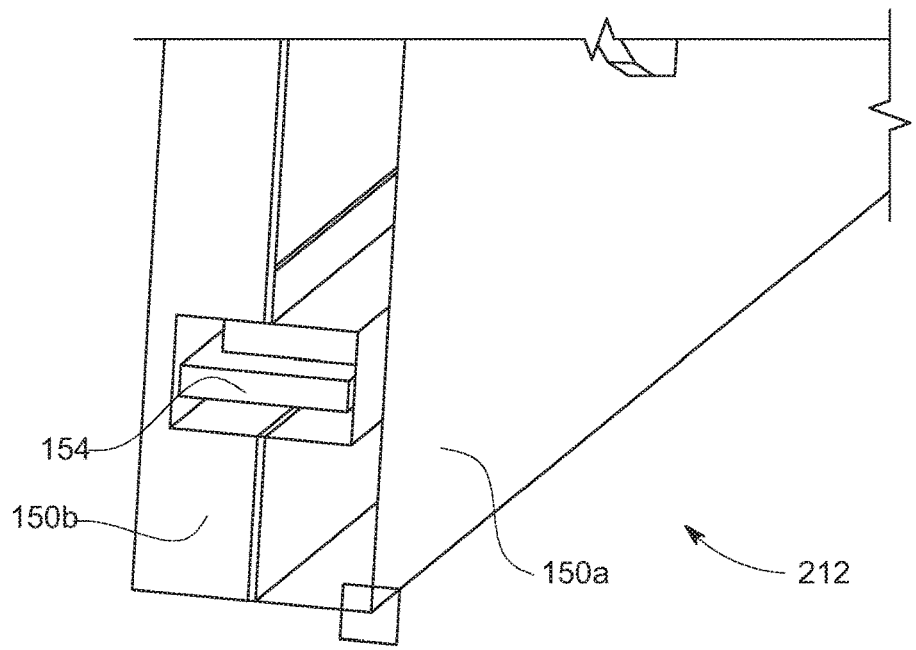

With reference to FIG. 15, a molded channel 152 at top and bottom of each panel accepts close fitting. A LED strip 154 is captured therebetween. LED strip 154 has red LED with sufficient dispersion to accomplish even light pattern across entire lettering field. Letter embossments 156 on the outer surface of the panels will be flush to the surface of the stop sign. Micro-optics 158 are on the backsides of the panels. A white, opaque, highly reflective film 160 is sandwiched between the panels. With reference to FIG. 16, capturing of LED 154 and its placement within sealed sign element sub-assembly 212 is shown. As described, sealed sign element sub-assembly 212 utilizes a LED light pipe concept.

Figure 17:
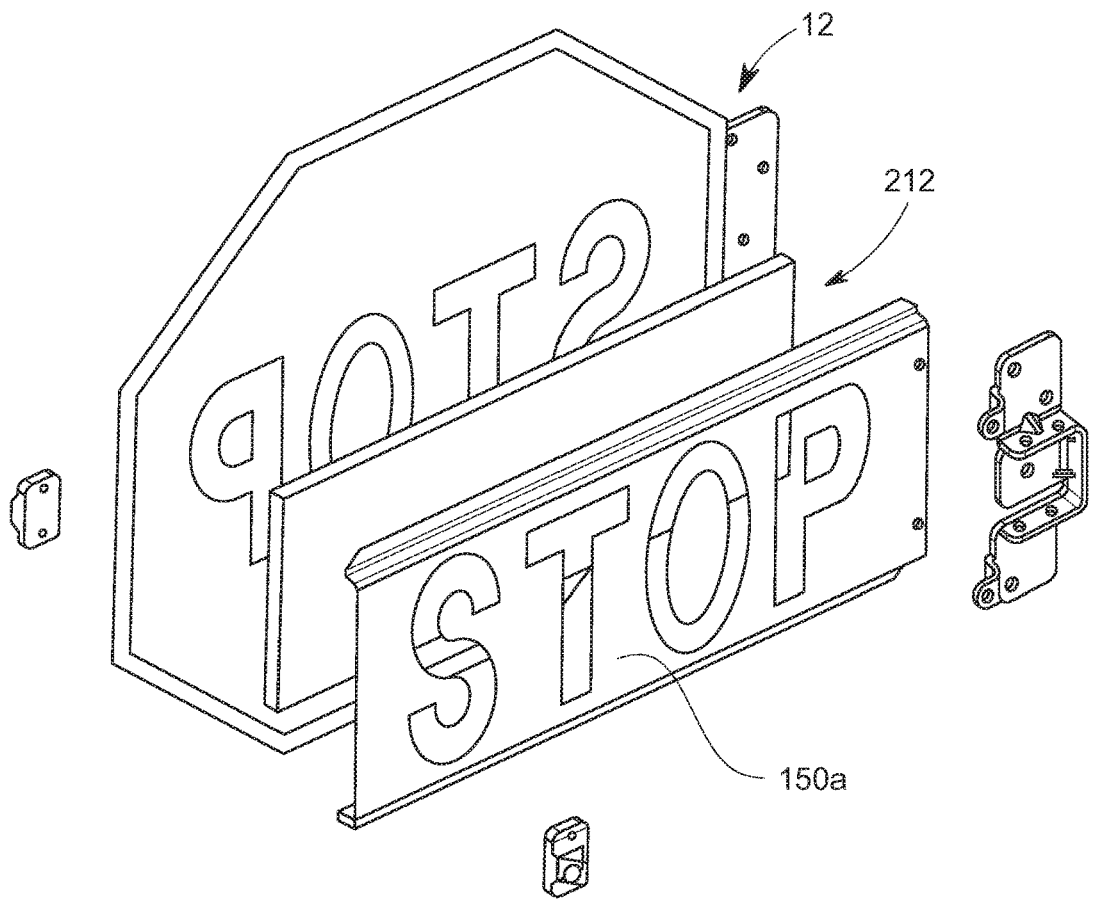
FIG. 17 illustrates the sealed sign element sub-assembly and sign component panels of the stop sign in accordance with the second embodiments of the present invention.

FIG. 17 illustrates sealed sign element sub-assembly 212 and sign component panels of stop sign 12 in accordance with the second embodiments of the present invention. The sealed element is installed between the sign component panels to shield unwanted light leakage from outside the lettering embossments.

As described, sealed sign element sub-assembly 212 provides an LED edge lit light sign concept which can be used as a strobe or flasher and is shown in the drawings to illuminate the lettering for "STOP". A similar technology for TIR (total internal reflection) lighting could also be applied to the signal lamps used on stop sign 12. Thus, in effect, the lamp would have indirect illumination of a lens element that functions as a signal lamp. This concept may offer advantages in raw material content versus current products used as signal lamps. Typically, these lamp systems have integrated control so this integration of control (intensity, pattern, and color) could control all illumination functions (lettering and signal lamps) of stop sign 12.

Figure 18:
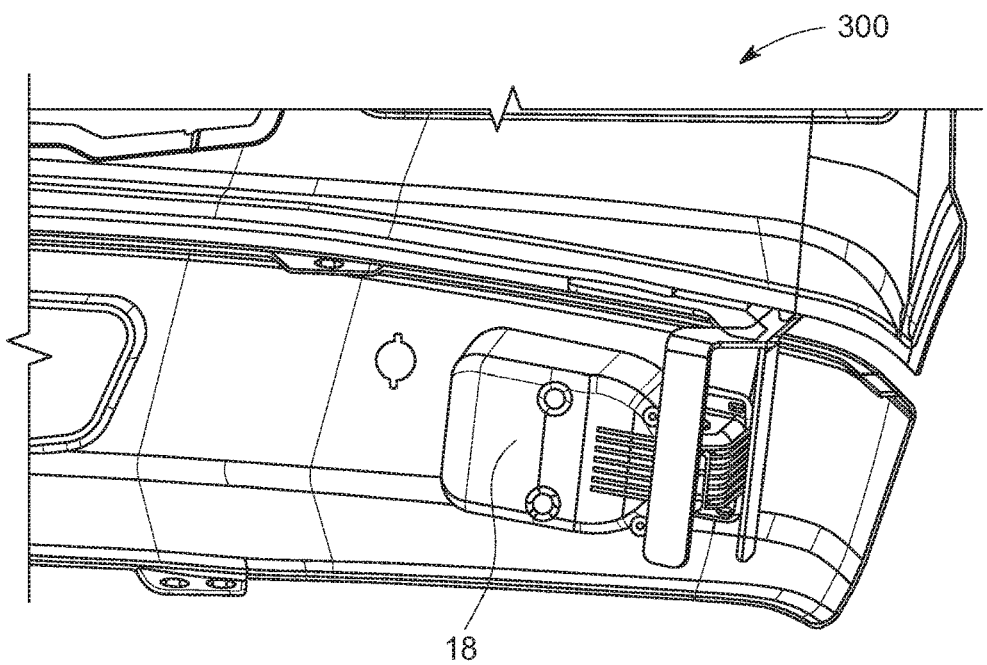
FIG. 18 illustrates a crossing guard arm assembly in accordance with third embodiments of the present invention, the crossing guard arm assembly being mounted to a bumper of a vehicle such as a school bus.
Figure 19:
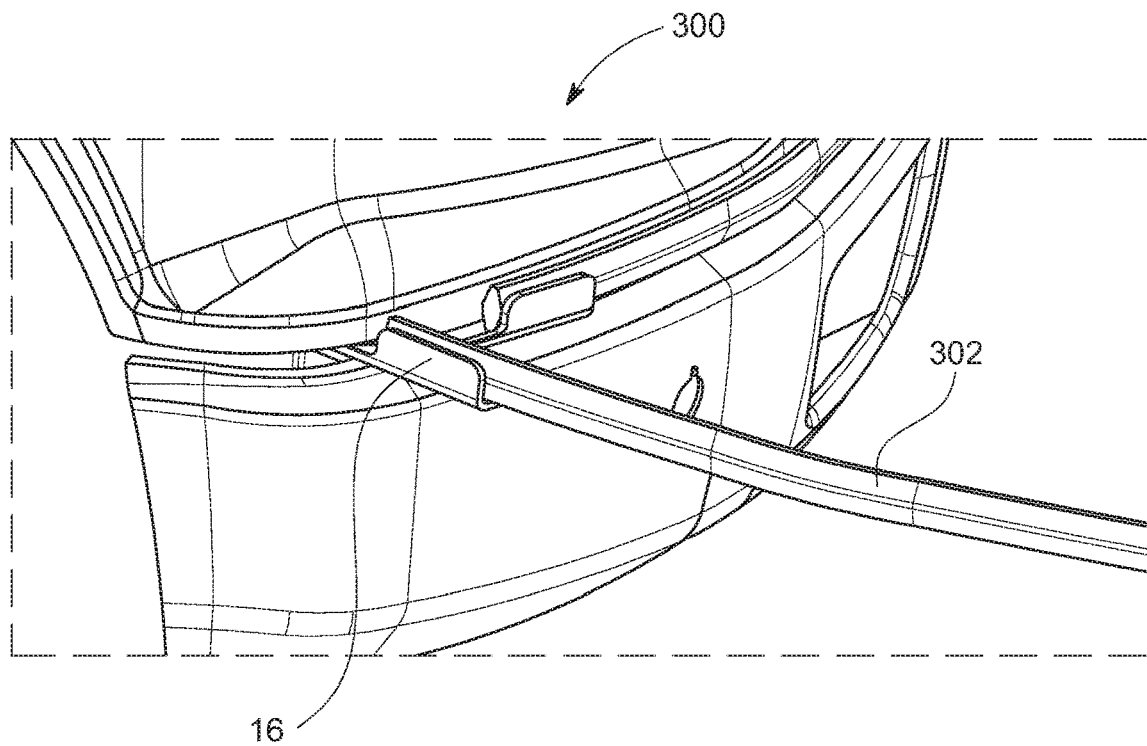
FIG. 19 illustrates the crossing guard arm of the crossing guard arm assembly in a deployed position.

Referring now to FIGS. 18 and 19, a crossing guard arm assembly 300 in accordance with third embodiments of the present invention is shown. Crossing guard arm assembly 300 may be embodied as stop sign assembly 10 with the difference being that crossing guard arm assembly 300 has a crossing guard arm 302 in place of stop sign 12. That is, other than the substitution of stop sign 12 with crossing guard arm 302, stop sign assembly 10 can be used unchanged, or with minor variants, to provide crossing guard arm assembly 300.

As such, crossing guard arm assembly 300 includes either an electric motor actuator or a pneumatic actuator housed within housing 18, a crossing guard arm 302, mechanical components including rotor bracket 14 and mounting bracket 16. Crossing guard arm assembly 300 is mounted to a bumper of a vehicle such as a school bus, as shown in FIG. 18. Mounting bracket 16 connects crossing guard arm 302 to rotor bracket 14. The actuator is connected to rotor bracket 14 to cause the rotor bracket to rotate during actuation of the actuator. Consequently, crossing guard arm 302 moves between stowed and deployed positions as the actuator is driven. In FIG. 19, crossing guard arm 302 is in the deployed position.

With reference to FIGS. 18 and 19, the crossing guard affix mechanism can adapt to behind the bumper mounting or also forward mounting. Rear closeout panel 20 can incorporate variations in mounting geometry or flexibility. Base actuator bolts may be tailored to unique swing arm bracket. Magnetic stowage of crossing guard arm 302 may also be provided.

Using the variants described herein offers the ability to have power to the crossing arm mechanism location so various forms of lighting could be incorporated into crossing guard arm 302.

As described, housing 18 is "common" to stop sign assembly 10 in that housing 18 is a part of the stop sign assembly whether the actuator of the stop sign assembly is electric motor actuator 20 or pneumatic actuator 50. As such, the common housing can be converted either to electric stop arm or pneumatic stop arm with simple module (i.e., electric motor actuator 20 or pneumatic actuator 50) replacement. Either of the electric motor actuator or pneumatic actuator variants can be applied to the crossing arm (at the front bumper).

Figure 20A:
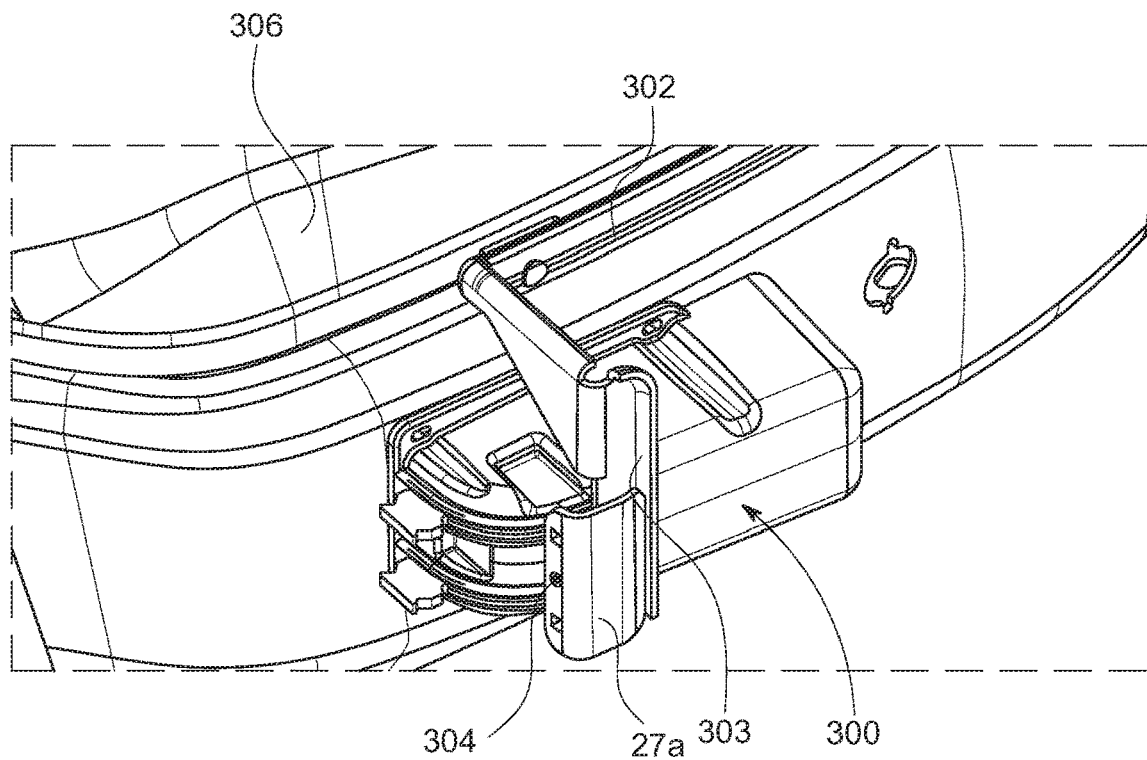
Figure 20C:
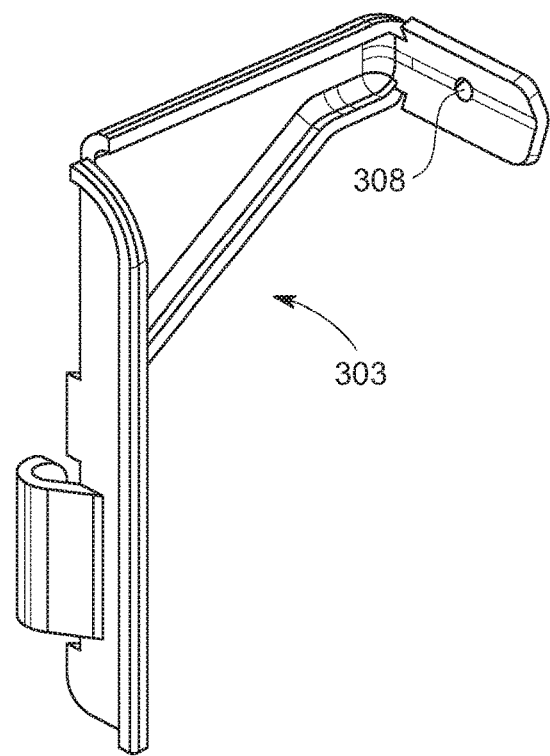
Figure 20D:
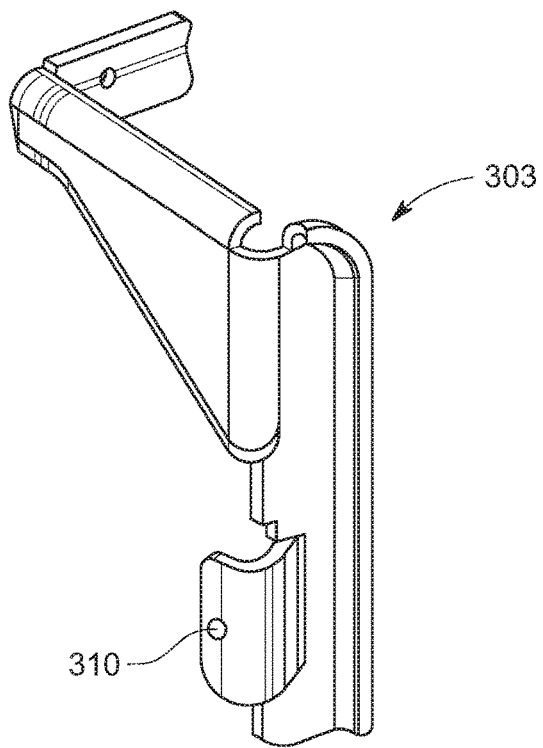

Referring now to FIGS. 20A, 20B, 20C, and 20D, respective views of crossing guard arm assembly 300 and components thereof are shown. As shown in FIG. 20A, crossing guard arm assembly 300 includes a mounting bracket 303 to which clamp bracket 27a connects via a mounting bolt at the location designated by reference numeral 304. Mounting bracket 303 is connected via a fender bolt or nut 306 to crossing guard arm 302, as also shown in FIG. 20B. FIGS. 20C and 20D illustrate mounting bracket 303. A through hole 308 of mounting bracket 303 for receiving fender bolt or nut 306 is shown in FIG. 20C. A through hole 310 of mounting bracket 303 for receiving a mounting bolt for mounting clamp bracket 27a thereto is shown in FIG. 20D.

Referring now to FIGS. 21A, 21B, 21C, and 21D, with continual reference to FIGS. 3A, 3B, 3C, and 3D, respective views of an attachment system for connecting stop sign 12 to stop sign assembly 10 in accordance with fourth embodiments of the present invention is shown. The attachment system uses a one screw sign attachment method which provides a clamp on style sign attachment that facilitates service or assembly without removing the entire stop sign assembly from a vehicle to which the stop sign assembly is mounted. This also facilitates using a variety of sign configurations for different purposes. This attachment, or clamping, system can be used to attach the crossing arm poly stick and then use these assemblies in the crossing arm applications adaptable to various vehicle models and mounting positions. Further, some adjustments to proportions of parts will occur to ensure controlled fit characteristics.

Figure 21A:
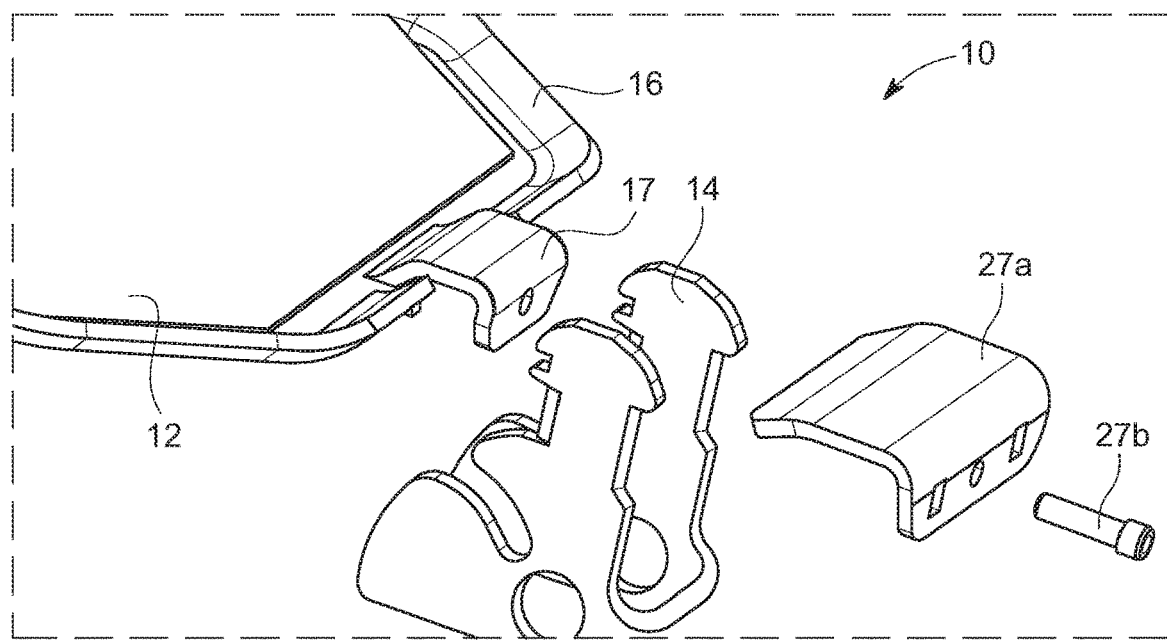
FIGS. 21A, 21B, 21C, and 21D illustrate respective views of an attachment system for connecting a stop sign to a stop sign assembly in accordance with fourth embodiments of the present invention.
Figure 21B:
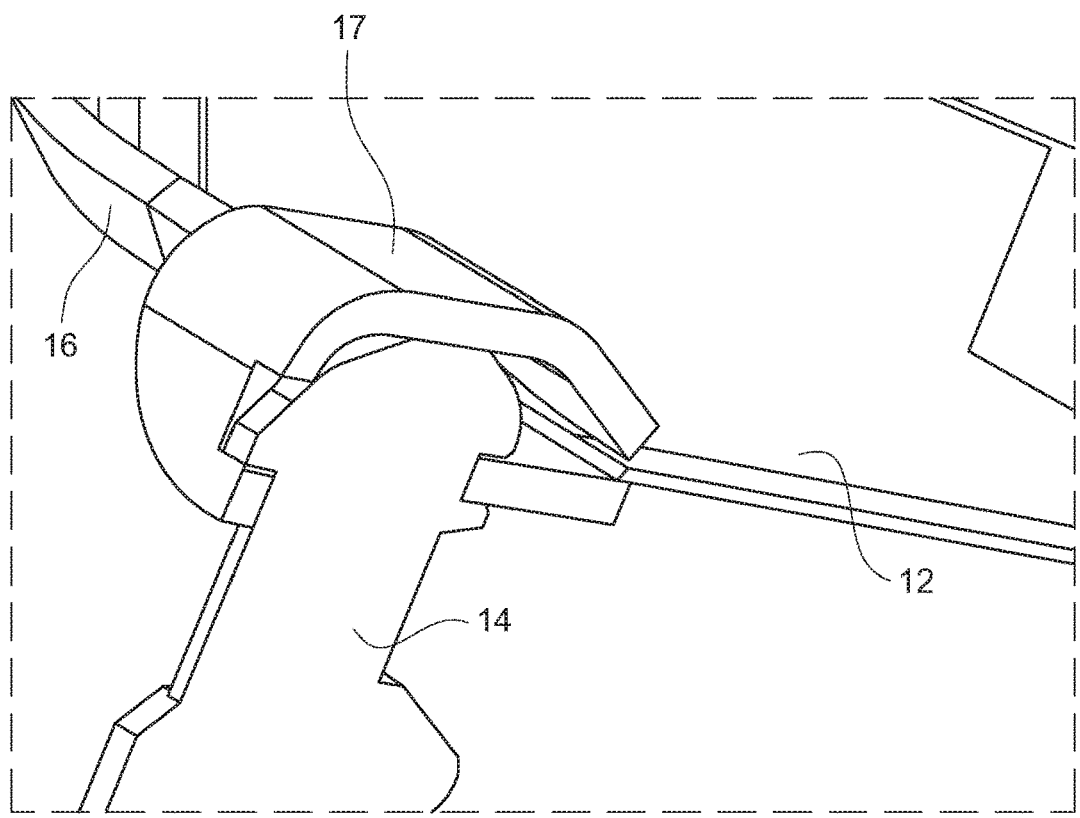
Figure 21C:
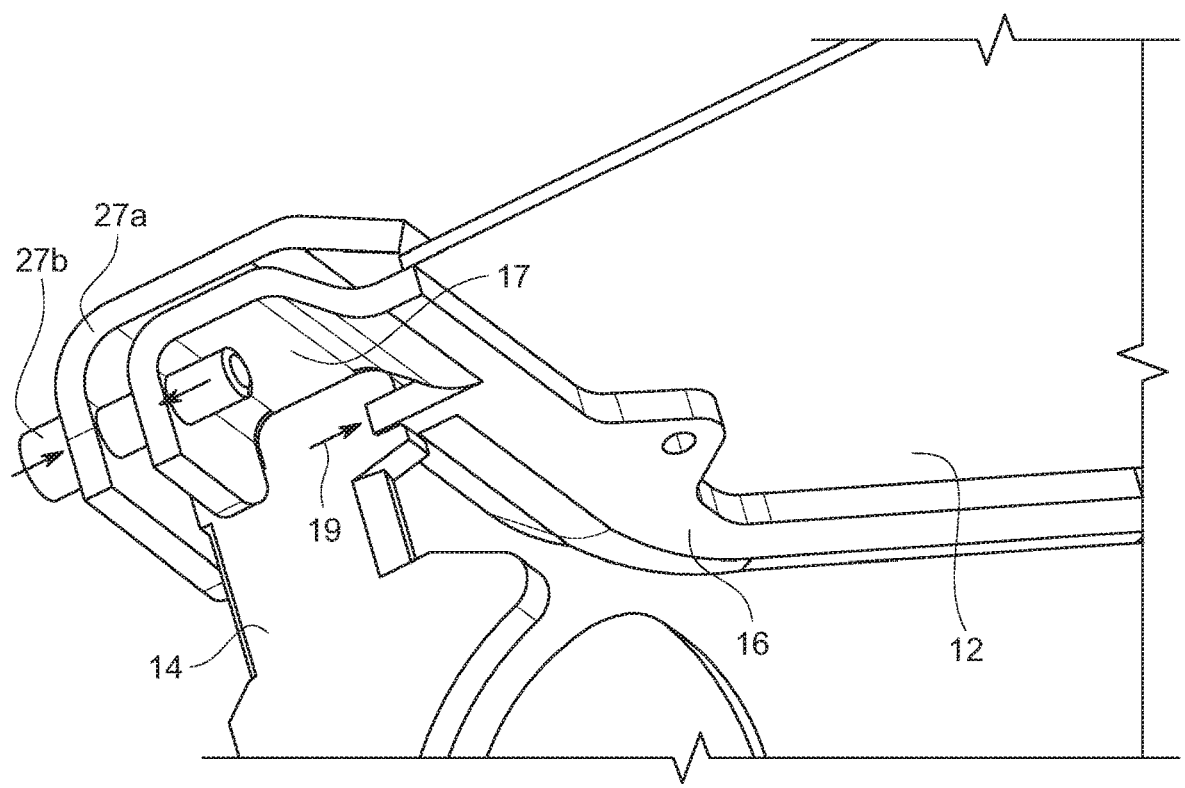
Figure 21D:
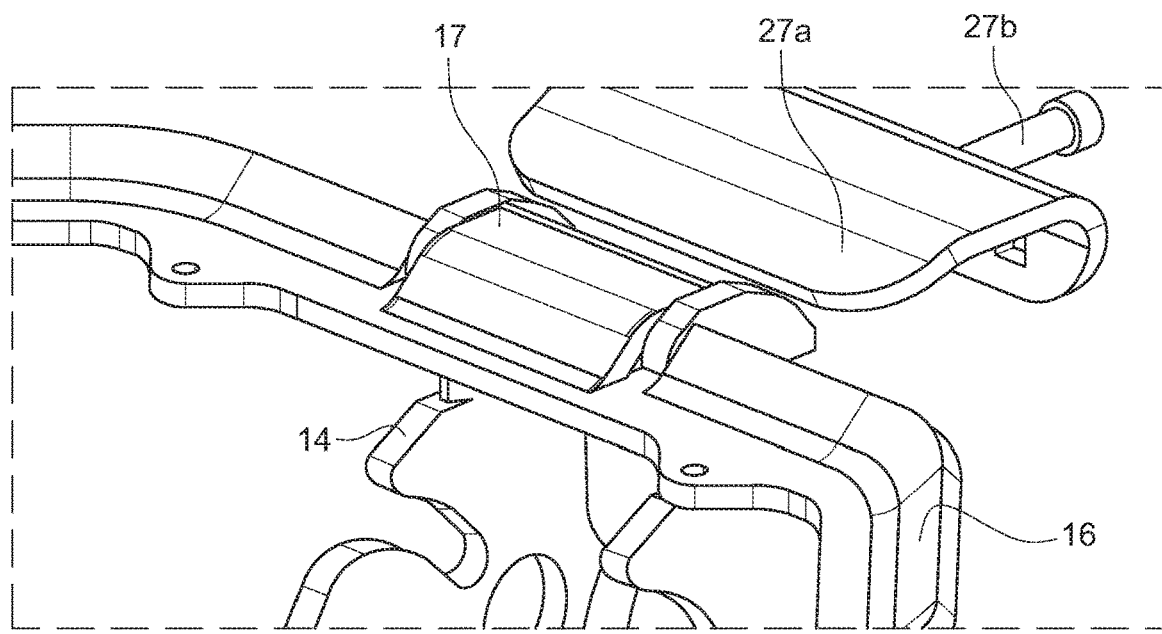

The attachment system includes flange 17 of mounting bracket 16, clamp 27a, and mounting screw 27b. These components, shown in an exploded view in FIG. 21A, are configured to provide multi axis stability when used to connect stop sign 12 to stop sign assembly 10 (or, more particularly, to connect stop sign 12 to rotor bracket 14). Turning to FIG. 21D, there it is shown rotor bracket 14 captures flange 17 of mounting bracket 16. This provides multi axis positional control. Turning back to FIG. 21B, a cross-sectional view of rotor bracket 14 and the captured portion of flange 17 of mounting bracket 16 is shown. Turning to FIG. 21C, mounting screw 27b screwing clamp bracket 27a and the captured portion of flange 17 of mounting bracket 16 together is shown. This screwing action draws mounting bracket 16 into a notch of rotor bracket 14 as indicated by reference numeral 19.

Referring now FIGS. 22A, 22B, 22C, 22D, 22E, 22F, 22G, 22H, and 22I, with continual reference to FIGS. 8, 9, 10, and 11, a dual action pressure relief valve 250 for use with pneumatic actuator 50 of stop sign assembly 10 will be described.

As overview, a vehicle such as a school bus may have two or more stop sign assemblies 10 such a stop sign assembly mounted at the front of the bus and a stop sign assembly mounted at the rear or the other side of the bus. The bus may have a crossing guard arm assembly 300 in addition to one or more stop sign assemblies 10. For ease of description, it will be assumed that the bus has two stop sign assemblies 10.

When the actuators of the two stop sign assemblies 10 are pneumatic actuators, it is difficult to close (i.e., move to the stowed position) the two stop signs 12 of the stop sign assemblies at roughly the same time depending on the positioning of the stop sign assemblies from the air source on the bus for the pneumatic actuators. That is, it is difficult to close the two stop signs 12 of the stop sign assemblies at roughly the same time when there are vastly different airline lengths. Typically, both air regulators are upfront in the bus so rear stop sign assembly 10 is slow to back feed the air release through the line to the solenoid where it is released. For instance, the pressure release has to push through fifty feet of air hose for rear stop sign assembly 10 and only two feet of air hose for front stop sign assembly 10.

Dual action pressure relief valve 250 is used with pneumatic actuator 50 of a stop sign assembly 10 to solve this problem to thereby enable the two stop sign assemblies 10 to close their respective stop signs 12 at roughly the same time (e.g., within one second of each other). Dual action pressure relief valve 250 is intended to work to release the pressure to the atmosphere right at stop sign 12. With reference to FIG. 9, the function of dual action pressure relief valve 250 is based on stowage magnet 66. Magnet 66 becomes a solenoid in its secondary function. When magnet 66 is inverse to the air pressure cycle, dual action pressure relief valve 250 is held open while magnet 66 is on and stop sign 12 is stowed. When pressure comes on for deploy, magnet 66 goes off and dual action pressure relief valve 250 closes under calibrated spring pressure. There is a secondary function to dual action pressure relief valve 250 in that the dual action pressure relief valve will open from pressure alone based on overcoming the spring force with air pressure. So, dual action pressure relief valve 250 should open just from overpressure regardless of magnet 66 mode on or off. Dual action pressure relief valve 250 is highly integrated. The valve spring is to be calibrated to function at the desired pressures.

Figure 22A:
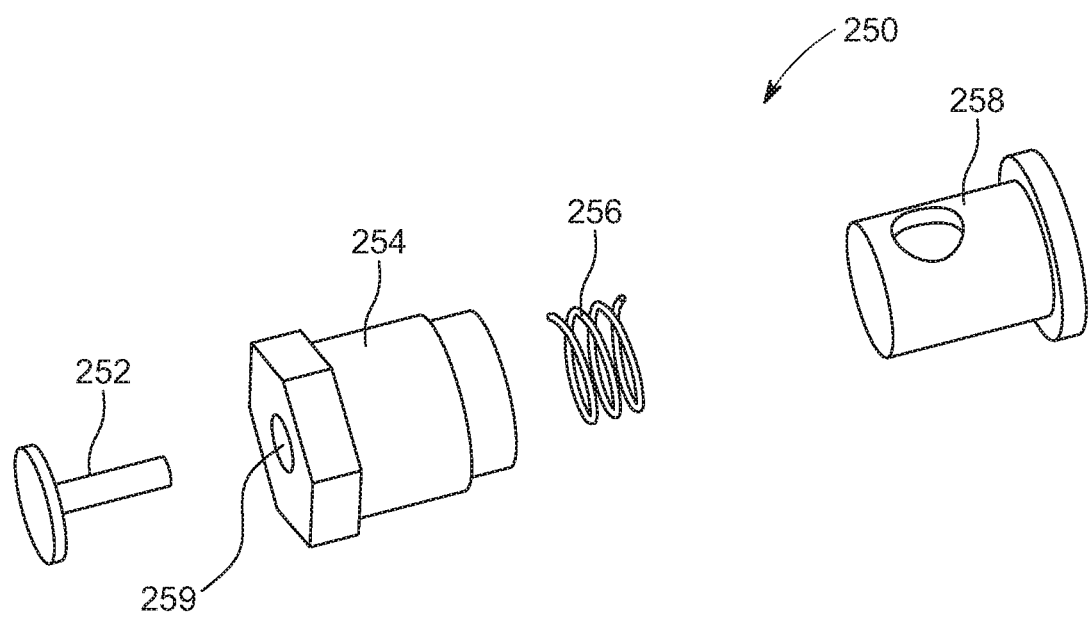
FIGS. 22A and 22B respectively illustrate an exploded view and a partial phantom perspective view of a dual action pressure relief valve for use with a pneumatic actuator of a stop sign assembly in accordance with fifth embodiments of the present invention.
Figure 22B:
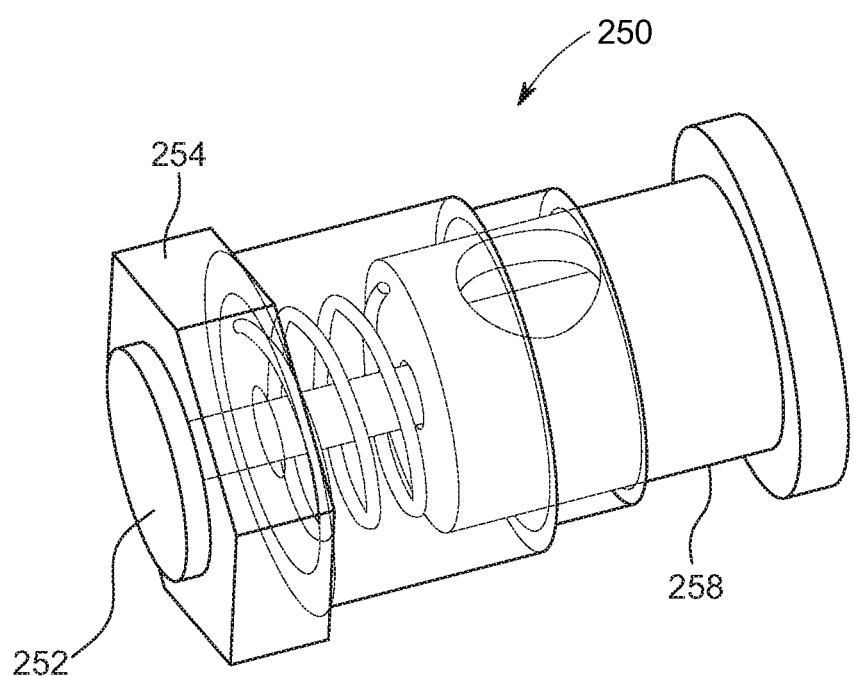
Figure 22C:
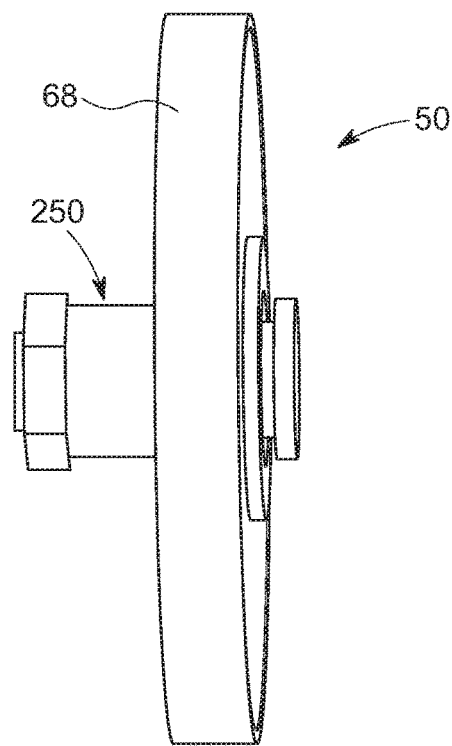
FIGS. 22C, 22D, 22E, and 22F respectively illustrate a side view, a tilted side view, a rear side view, and a front side view of the dual action pressure relief valve installed in a port in an air inlet cover of the pneumatic actuator.
Figure 22D:
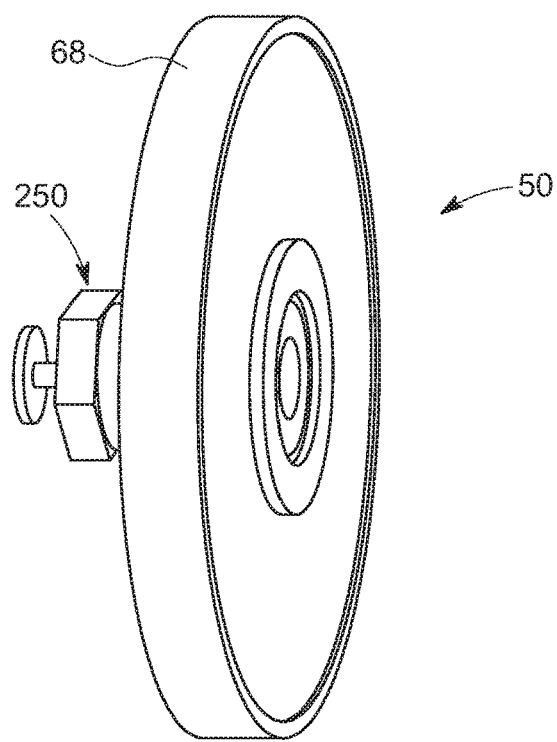
Figure 22E:
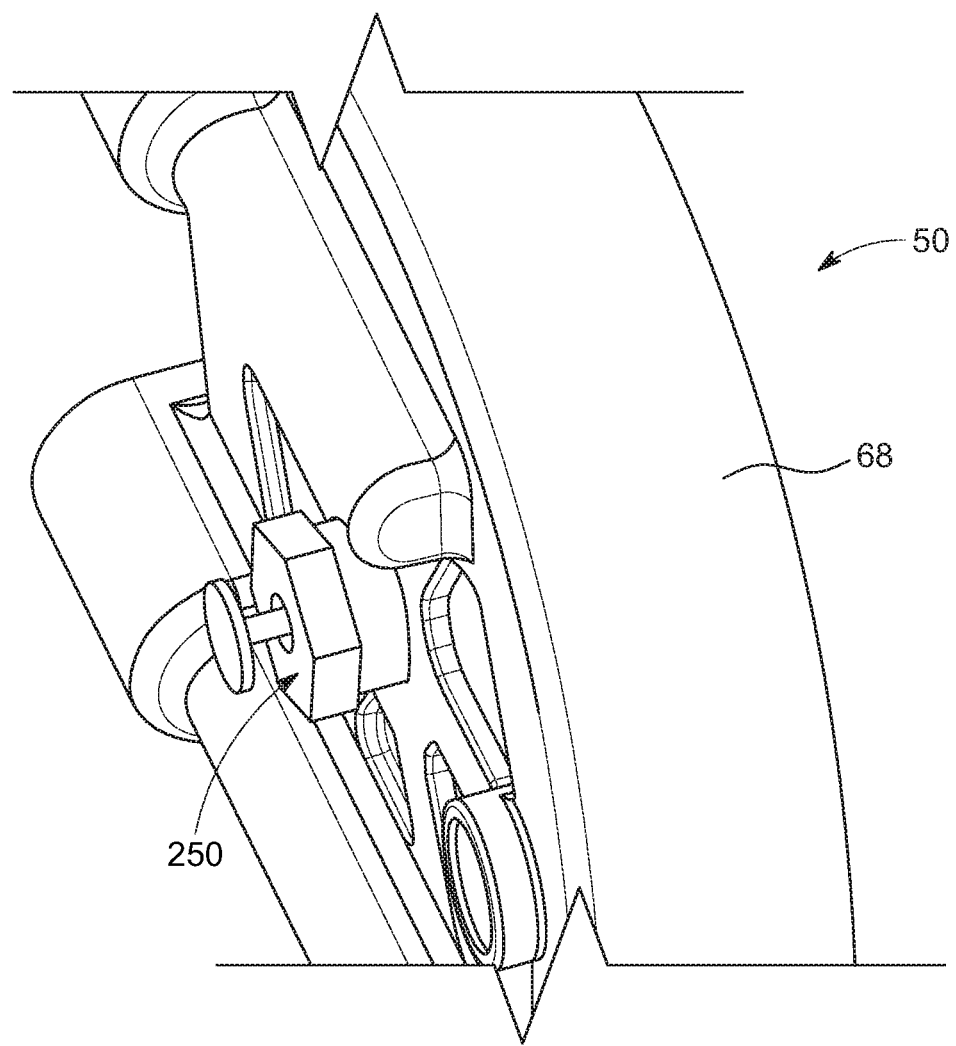
Figure 22F:
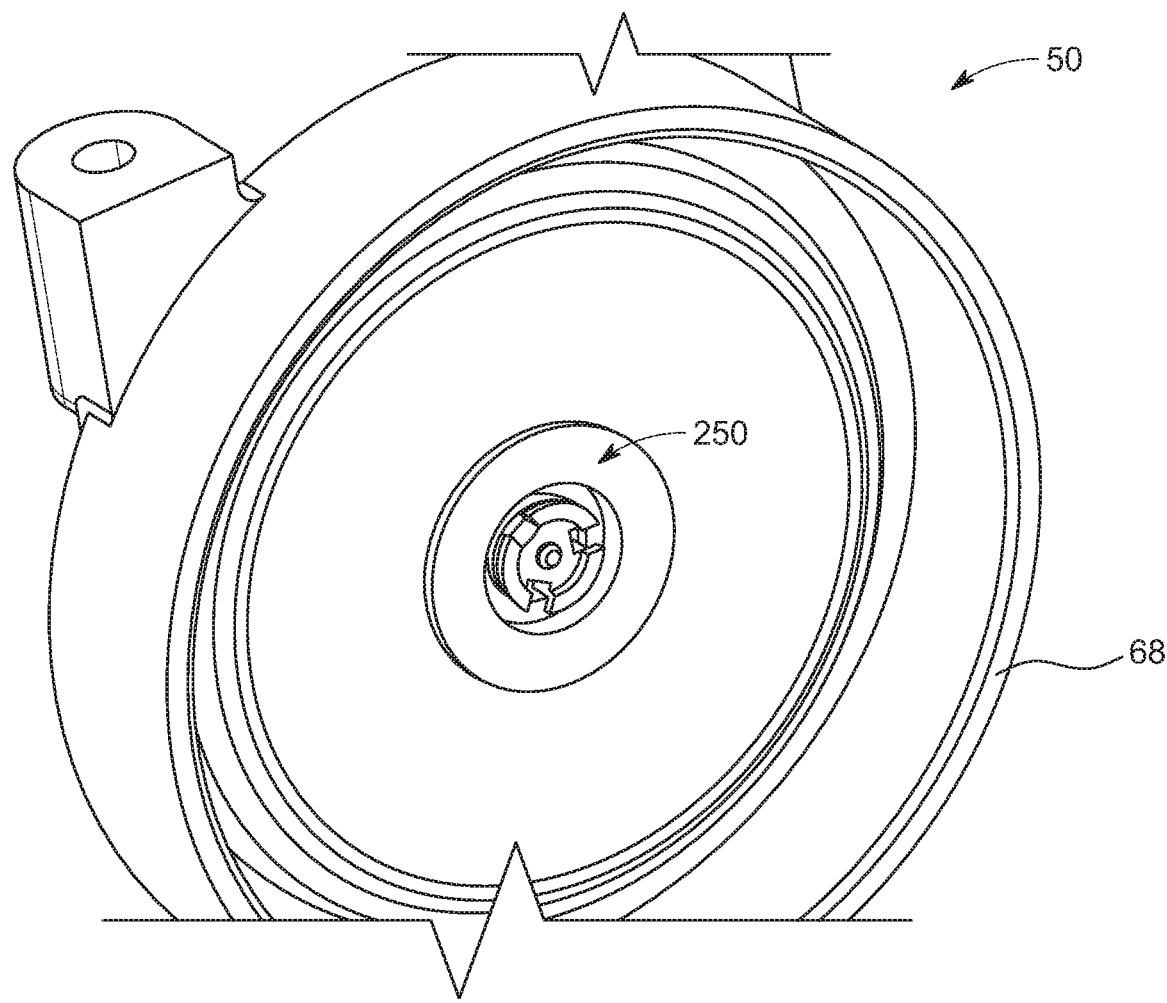

FIGS. 22A and 22B respectively illustrate an exploded view and a partial phantom perspective view of dual action pressure relief valve 250. Dual action pressure relief valve 250 includes a valve plunger 252, a hollow bolt 254, a spring 256, and a metal armature of solenoid 258. Hollow bolt 254 includes a pressure escape hole 259. The valve threads to armature. Hollow bolt 254 is used to mount magnet 66 to housing. Spring 256 is calibrated for operational pressure.

FIGS. 22C, 22D, 22E, and 22F respectively illustrate a side view, a tilted side view, a rear side view, and a front side view of dual action pressure relief valve 250 installed in a port (best shown in FIG. 9) in air inlet cover 68 of pneumatic actuator 50.

Figure 22G:
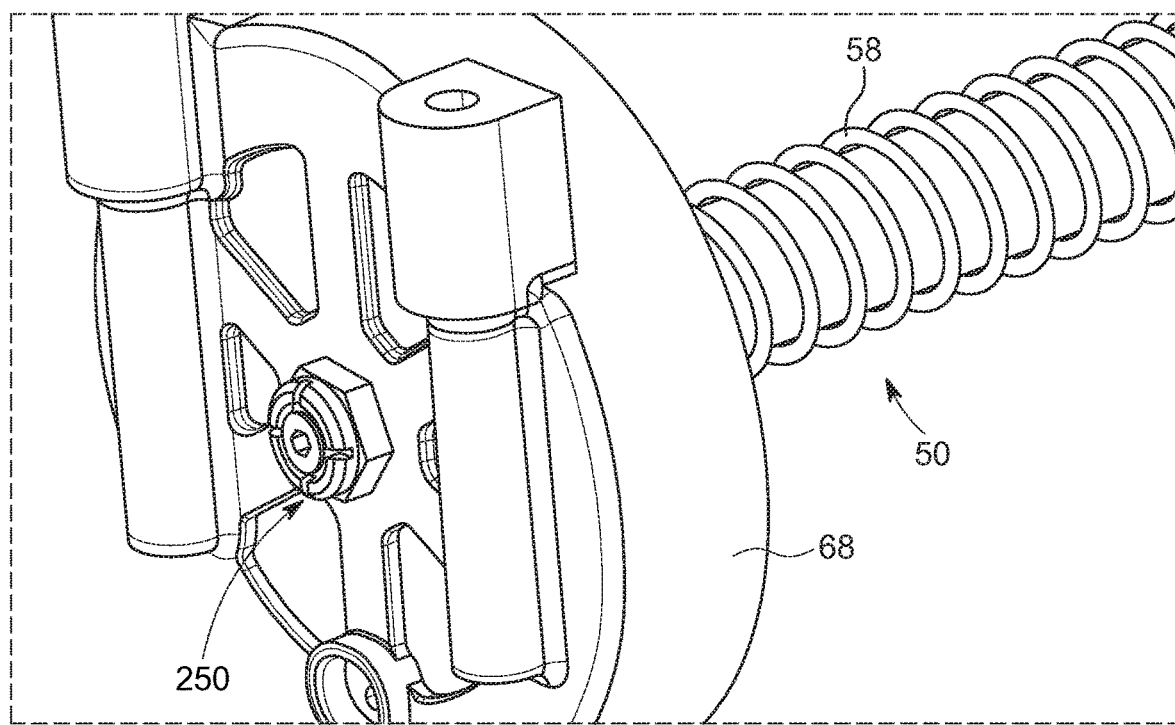
FIG. 22G illustrates a rear side view of the dual action pressure relief valve installed in the port in the air inlet cover of the pneumatic actuator along with the spring-loaded pushrod of the pneumatic actuator.

FIG. 22G illustrates a rear side view of dual action pressure relief valve 250 installed in the port in air inlet cover 68 of pneumatic actuator 50 along with spring-loaded pushrod 60 of the pneumatic actuator.

Figure 22H:
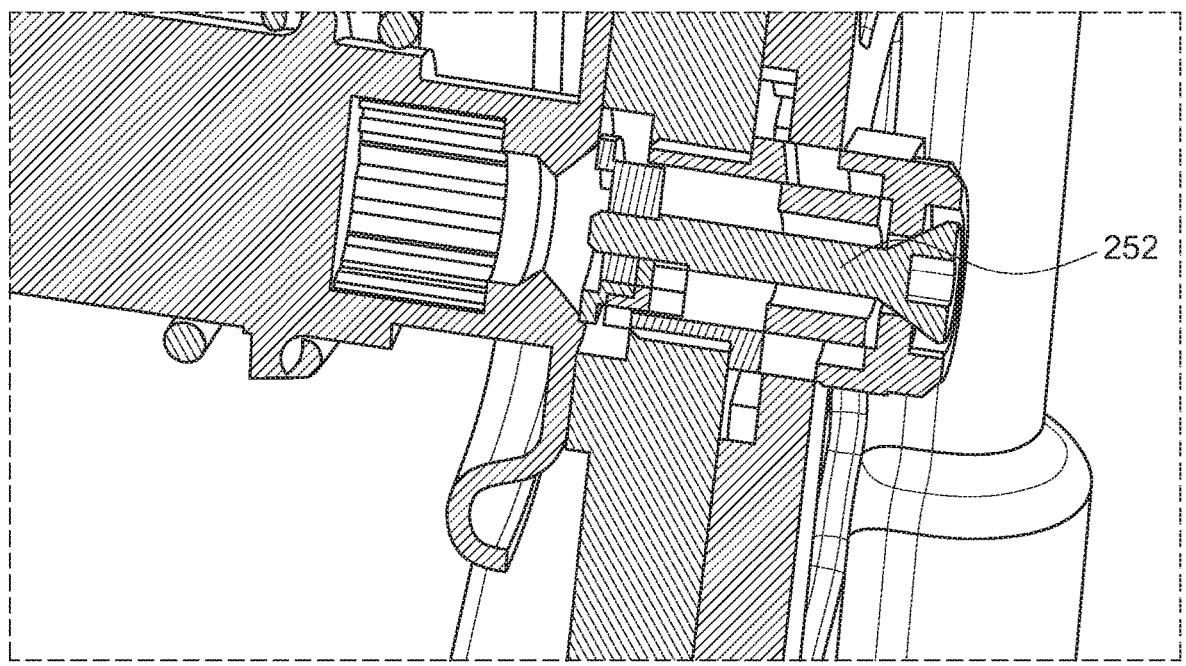
FIG. 22H illustrates a cross-sectional view of the dual action pressure relief valve installed in the port in the air inlet cover of the pneumatic actuator, the dual action pressure relief valve being closed.

FIG. 22H illustrates a cross-sectional view of dual action pressure relief valve 250 installed in the port in air inlet cover 68 of pneumatic actuator 50. Dual action pressure relief valve 250 is closed.

Figure 22I:
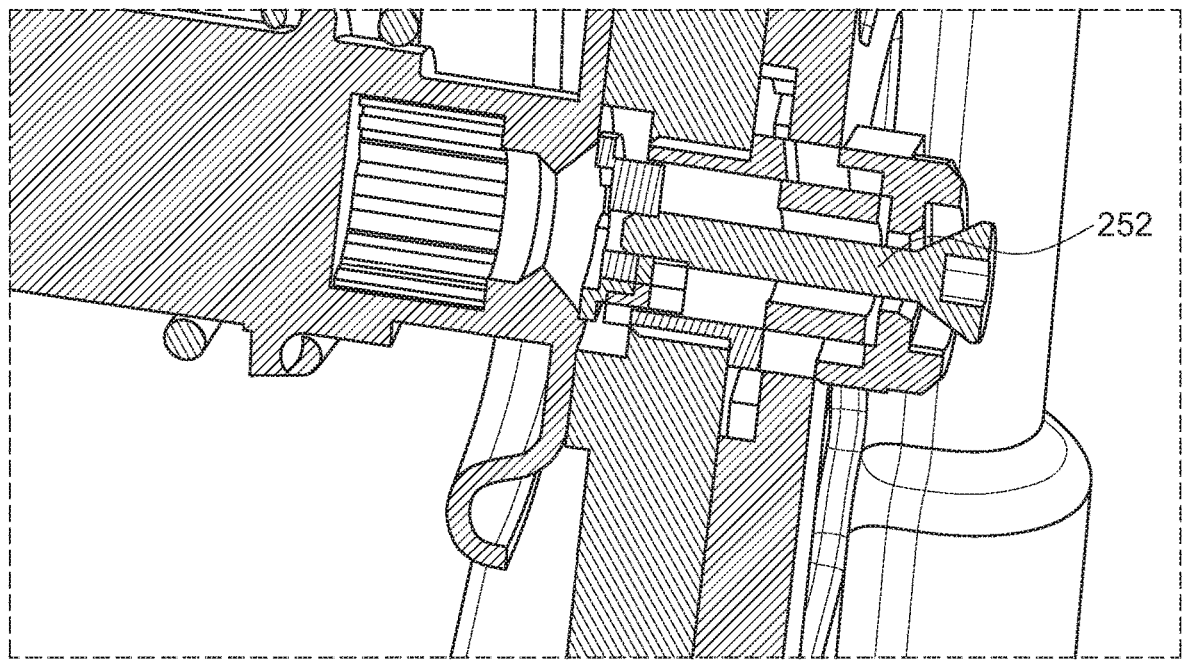
FIG. 22I illustrates a cross-sectional view of the dual action pressure relief valve installed in the port in the air inlet cover of the pneumatic actuator, the dual action pressure relief valve being opened.

FIG. 22I illustrates a cross-sectional view of dual action pressure relief valve 250 installed in the port in air inlet cover 68 of pneumatic actuator 50. Dual action pressure relief valve 250 is opened.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An assembly comprising:
    a common parts sub-assembly including a rotor bracket and a housing;
    an actuator connected to the rotor bracket to cause the rotor bracket to rotate during actuation of the actuator, the actuator and the rotor bracket connected thereto are housed within the housing;
    a physical appendage;
    a mounting bracket connecting the physical appendage to the rotor bracket whereby the physical appendage moves between a stowed position and a deployed position during actuation of the actuator; and
    wherein the actuator is either an electric motor actuator or a pneumatic actuator that are substitutable with one another to assemble the assembly without modification to any of the common parts sub-assembly and the physical appendage;
    the actuator is the pneumatic actuator; and
    the pneumatic actuator includes a spring-loaded pushrod, an air bladder, and an actuator housing, the spring-loaded pushrod and the air bladder are operatively received within the actuator housing and the actuator housing and the rotor bracket are operatively connected to connect the pneumatic actuator to the rotor bracket to cause the rotor bracket to rotate during actuation of the pneumatic actuator.

2. The assembly of claim 1 wherein:
    the pneumatic actuator further includes an electro-magnet to assist in restraining the rotor bracket to prevent unintentional deployment of the physical appendage, the electro-magnet being energized when the physical appendage is in the stowed position and being de-energized when the physical appendage is in the deployed position.

3. The assembly of claim 2 wherein:
    the pneumatic actuator further includes a dual action pressure relief valve in operative arrangement for controlling air from an air source to the air bladder of the pneumatic actuator, the dual action pressure relief valve functioning with the electro-magnet to be held open while the electro-magnet is being energized and to close while the electro-magnet is being de-energized.

4. The assembly of claim 1 wherein:
    the physical appendage is either a stop sign or a crossing guard arm that are substitutable with one another to assemble the assembly without modification to any of the common parts sub-assembly and the actuator.

5. The assembly of claim 4 wherein:
the mounting bracket is of a first type when the physical appendage is the stop sign and the mounting bracket is of a second type when the physical appendage is the crossing guard arm.

6. The assembly of claim 1 wherein:
the housing is mounted to a vehicle; and
the physical appendage is tucked near the vehicle when the physical appendage is in the stowed position and extends out away from the vehicle when the physical appendage is in the deployed position.

7. The assembly of claim 1 wherein:
the common parts sub-assembly further includes an electrical connector and the physical appendage includes a corresponding electrical connector and the electrical connectors are connected together for illuminators of the physical appendage to receive electricity.

8. The assembly of claim 1 wherein the assembly is for a school bus with the housing being mountable to the school bus.

9. An assembly comprising:
a rotor bracket;
an actuator connected to the rotor bracket to cause the rotor bracket to rotate during actuation of the actuator;
a housing, wherein the actuator with the rotor bracket connected thereto are housed within the housing;
a physical appendage;
a mounting bracket connecting the physical appendage to the rotor bracket whereby the physical appendage moves between stowed and deployed positions during the actuation of the actuator; and
wherein the actuator is either an electric motor actuator or a pneumatic actuator that are substitutable with one another to assemble the assembly without modification to the rotor bracket, the housing, the physical appendage, or the mounting bracket;
the actuator is the pneumatic actuator; and
the pneumatic actuator includes a spring-loaded pushrod, an air bladder, and an actuator housing, the spring-loaded pushrod and the air bladder are operatively received within the actuator housing and the actuator housing and the rotor bracket are operatively connected to connect the pneumatic actuator to the rotor bracket to cause the rotor bracket to rotate during actuation of the pneumatic actuator.

10. The assembly of claim 9 wherein:
the physical appendage is either a stop sign or a crossing guard arm.

* * * * *